US008889573B2

(12) United States Patent
Kamisasa

(10) Patent No.: US 8,889,573 B2
(45) Date of Patent: Nov. 18, 2014

(54) FIBER ASSEMBLY, COMPOSITE OF ELECTRO CONDUCTIVE SUBSTRATE AND FIBER ASSEMBLY, AND PRODUCTION METHODS THEREOF

(75) Inventor: Toshio Kamisasa, Hyogo (JP)

(73) Assignees: Daiwabo Holdings Co., Ltd., Osaka (JP); Daiwabo Polytec Co., Ltd., Osaka (JP)

( * ) Notice: Subject to any disclaimer, the term of this patent is extended or adjusted under 35 U.S.C. 154(b) by 809 days.

(21) Appl. No.: 13/062,333

(22) PCT Filed: Sep. 4, 2009

(86) PCT No.: PCT/JP2009/065535
§ 371 (c)(1),
(2), (4) Date: Mar. 10, 2011

(87) PCT Pub. No.: WO2010/027063
PCT Pub. Date: Mar. 11, 2010

(65) Prior Publication Data
US 2011/0177395 A1 Jul. 21, 2011

(30) Foreign Application Priority Data

Sep. 4, 2008 (JP) ................................. 2008-227205
Feb. 12, 2009 (JP) ................................. 2009-030132

(51) Int. Cl.
*D04H 3/02* (2006.01)
*D02G 3/00* (2006.01)
(Continued)

(52) U.S. Cl.
CPC ................ *H01M 2/162* (2013.01); *D01D 5/36* (2013.01); *H01M 2/145* (2013.01);
(Continued)

(58) Field of Classification Search
USPC ........................... 442/361–364; 428/372, 373; 429/129–147, 247–255
See application file for complete search history.

(56) References Cited

U.S. PATENT DOCUMENTS 5,814,404 A 9/1998 Rutherford et al.
6,552,123 B1 * 4/2003 Katayama et al. .............. 525/57
(Continued)

FOREIGN PATENT DOCUMENTS

EP 1 179 864 2/2002
EP 1 689 008 8/2006
(Continued)

OTHER PUBLICATIONS

Crompton, T.R; Physical Testing of Plastics, pp. 185-189; copyright 2012 Smithers Rapra Technology Ltd.*
(Continued)

*Primary Examiner* — Jennifer A Steele
(74) *Attorney, Agent, or Firm* — Hamre, Schumann, Mueller & Larson, P.C.

(57) ABSTRACT

The present invention relates to a fiber assembly obtained by electrifying a resin in a melted state by application of voltage between a supply-side electrode and a collection-side electrode so as to extend the resin into an ultrafine composite fiber by electrospinning, and accumulating the ultrafine composite fiber, wherein the ultrafine composite fiber includes at least two polymeric components and the ultrafine composite fiber includes at least one type of composite fiber selected from a sea-island structure composite fiber and a core-sheath structure composite fiber as viewed in fiber cross section, at least one selected from an island component and a core component has a volume specific resistance of $10^{15}$ Ω·cm or less, and at least one selected from a sea component and a sheath component has a volume specific resistance exceeding $10^{15}$ Ω·cm. Thereby, the present invention provides a fiber assembly obtained by accumulating an ultrafine composite fiber obtained by electrospinning without the use of any solvent or water as a spinning solution, a composite of an electro conductive substrate and such a fiber assembly, and production methods thereof.

17 Claims, 11 Drawing Sheets

(51) Int. Cl.
*D01D 5/36* (2006.01)
*H01M 2/14* (2006.01)
*H01M 4/139* (2010.01)
*H01M 2/16* (2006.01)
*H01M 4/66* (2006.01)
*H01M 4/13* (2010.01)
*D04H 3/016* (2012.01)
*D04H 3/147* (2012.01)
*D01D 5/00* (2006.01)
*D01D 5/34* (2006.01)
*D04H 1/728* (2012.01)
*D01F 8/06* (2006.01)
*H01M 10/0525* (2010.01)

(52) U.S. Cl.
CPC ............. *H01M 4/139* (2013.01); *H01M 4/661* (2013.01); *H01M 10/0525* (2013.01); *H01M 4/13* (2013.01); *D04H 3/016* (2013.01); *D04H 3/147* (2013.01); *D01D 5/0023* (2013.01); *D01D 5/34* (2013.01); *H01M 2/1673* (2013.01); *D04H 1/728* (2013.01); *Y02E 60/122* (2013.01); *D01F 8/06* (2013.01)
USPC ........... 442/361; 442/362; 442/363; 442/364; 428/373; 428/374; 264/484

(56) References Cited

U.S. PATENT DOCUMENTS

| | | | |
|---|---|---|---|
| 7,438,777 B2 * | 10/2008 | Pourdeyhimi et al. | 156/148 |
| 7,767,297 B2 * | 8/2010 | Tajima et al. | 428/372 |
| 8,486,554 B2 * | 7/2013 | Ito et al. | 429/144 |
| 2002/0100725 A1 * | 8/2002 | Lee et al. | 210/503 |
| 2003/0072999 A1 | 4/2003 | Birke et al. | |
| 2005/0032450 A1 | 2/2005 | Haggard et al. | |
| 2005/0079781 A1 * | 4/2005 | Tsujimoto et al. | 442/59 |
| 2006/0057350 A1 * | 3/2006 | Ochi et al. | 428/292.1 |
| 2006/0213829 A1 | 9/2006 | Rutledge et al. | |
| 2006/0292369 A1 * | 12/2006 | Rutledge et al. | 428/364 |
| 2010/0080993 A1 | 4/2010 | Privitera et al. | |
| 2010/0297443 A1 | 11/2010 | Kamisasa et al. | |

FOREIGN PATENT DOCUMENTS

| | | |
|---|---|---|
| EP | 2 077 593 | 7/2009 |
| JP | 56-501325 | 9/1981 |
| JP | 2003/109654 | 4/2003 |
| JP | 2003/163033 | 6/2003 |
| JP | 2004-162244 | 6/2004 |
| JP | 2005-154927 | 6/2005 |
| JP | 2006-069142 | 3/2006 |
| JP | 2006-092829 | 4/2006 |
| JP | 2007-154336 | 6/2007 |
| JP | 2007-197859 | 8/2007 |
| JP | 2007-239114 | 9/2007 |
| JP | 2007-321294 | 12/2007 |
| JP | 2008-007902 | 1/2008 |
| JP | 2008-013864 | 1/2008 |
| JP | 2008-088590 | 4/2008 |
| JP | 2008-101315 | 5/2008 |
| JP | 2008-303521 | 12/2008 |
| JP | 2009-024295 | 2/2009 |
| WO | 95/33874 | 12/1995 |
| WO | 98/01607 | 1/1998 |
| WO | 02/36865 | 5/2002 |
| WO | 2006/099107 | 9/2006 |
| WO | 2007/105479 | 9/2007 |
| WO | 2008/047542 | 4/2008 |
| WO | WO 2009/069759 A1 | 6/2009 |

OTHER PUBLICATIONS

Handbook of Polymers; PAN Properties; pp. 265 and 266 and copyright 2012 Chem Tec Publishing.*

Subbiah, T. "Electrospinning of Nanofibers"; Journal of Applied Polymer Science; vol. 96, Issue 2, pp. 557-569; published online Feb. 15, 2005; copyright 2008 Wiley Periodials, Wiley Company.*

* cited by examiner

FIBER ASSEMBLY, COMPOSITE OF ELECTRO CONDUCTIVE SUBSTRATE AND FIBER ASSEMBLY, AND PRODUCTION METHODS THEREOF

TECHNICAL FIELD

The present invention relates to a fiber assembly obtained using an electrospinning method, a composite of an electro conductive substrate and such a fiber assembly, and production methods thereof.

BACKGROUND ART

Conventionally, synthetic fibers including fibers of polyesters such as polyethylene terephthalate (PET), polyamide fibers such as nylon, and polyolefin fibers such as polyethylene and polypropylene generally are produced by a melt-spinning method. Ultrafine fibers such as nanofibers are known to be formed by splitting a sea-island fiber into nanofibers by removing the sea component of the sea-island fiber with the use of a solvent so as to leave the island component that will be nanofibers (Patent Document 1). Such ultrafine fibers have a small fiber diameter, and thus thermally-bonded non-woven fabrics made of the ultrafine fibers are suitable for use as clothing materials, automobile components and the like. For example, Patent Document 2 discloses a thermally-bonded non-woven fabric made of nanofibers, and proposes production of the non-woven fabric by desorbing and removing the sea component from a sea-island fiber having two different types of island components and thermally bonding the two types of island components. This method, however, is disadvantageous in that it requires removal of a large amount of sea component by using a solvent after spinning or production of the non-woven fabric, which makes the process complex and costly.

Another known method for producing an ultrafine fiber is an electrospinning method as described in, for example, Patent Document 3 in which an ultrafine fiber is spun by applying high voltage to a polymer solution or a polymer melt. The electrospinning method is said to be cost advantageous in that it does not require removal or disposal of the sea component and is simple. It is known that the electrospinning method can be classified into a solution method and a melt method, depending on the system for supplying a source material. The solution method is a method including supplying an aqueous solution containing a source resin dispersed therein or a flowable source resin solution, electrifying the source resin to charge the source resin, and forming a fiber by electrical attraction. On the other hand, the melt method is a method including supplying a solid source resin-formed product, electrifying the source resin to charge the source resin, heating and melting the source resin, and forming a fiber by electrical attraction.

Conventional battery electrode plates and separators are produced separately, and a plurality of electrode plates and a separator are laminated and housed in a battery for use. Merely laminating (without fixing) the electrode plates and the separator is problematic in that, since the separator itself is thin, the electrode plates and the separator may be displaced relative to each other or wrinkled during the process of housing them in a battery. In addition, in order to reduce such displacement and wrinkling, it is necessary to set the line tension during the housing process so as to correspond to the separator having a low tensile strength, and this causes a problem of slowing down the production.

Furthermore, integrated configurations of an electrode plate and a separator have been proposed (Patent Documents 4 and 5), but such configurations are obtained by separately producing the electrode plate and the separator, and then integrating them by using an adhesive or by heat treatment. That is, there is a process of affixing the electrode plate and the separator, and inhibition of displacement and wrinkling has not been achieved. In addition, with such integrated configurations, the electrode plate and the separator will be detached from each other easily because they are separately produced and then integrated together.

Recently, attempts have been made to produce a battery separator by using a solution electrospinning method (Patent Document 6), but this technique is employed only to process a single component polymer into a fiber to give a separator, and such separators have a problem of undergoing significant shrinkage during heat treatment. Also, there is another problem: in the solution electrospinning method, in particular, the solvent or water used during the spinning process remains in the fiber, which may have harmful effects on the product.

PRIOR ART DOCUMENTS

Patent Documents

Patent Document 1: JP 2004-162244 A
Patent Document 2: JP 2008-088590 A
Patent Document 3: JP 2007-239114 A
Patent Document 4: JP 2003-109654 A
Patent Document 5: JP 2003-163033 A
Patent Document 6: JP 2006-092829 A

DISCLOSURE OF INVENTION

Problem to be Solved by the Invention

Due to the nature of source material, supply as described above, it is difficult to obtain sea-island structure and/or core-sheath structure composite fibers by the solution electrospinning method. Also, no attempts have been made to produce composite fibers by the melt electrospinning method. For example, ethylene-propylene (EP) copolymers, polyethylene (PE) and the like, which are used conventionally as the sea component or sheath component of a fiber constituting a non-woven fabric in order to obtain thermal adhesiveness, hardly can be electrified and it is thus difficult to electrospin. For this reason, in connection with an electrospun non-woven fabric, it has been difficult to obtain a fiber assembly in which an ultrafine composite fiber whose surface is made of a component on which it is difficult to perform electrospinning is accumulated.

In order to solve the problems encountered with the conventional technology, the present invention provides a fiber assembly obtained by electrospinning a composite-resin-formed product containing a combination of a component on which it is difficult to perform electrospinning and a component having a volume specific resistance less than or equal to a specific value without the use of any solvent or water as a spinning solution so as to obtain an ultrafine composite fiber, and accumulating the ultrafine composite fiber, as well as a composite of an electro conductive substrate and such a fiber assembly, and production methods thereof.

Means for Solving Problem

A fiber assembly according to the present invention is a fiber assembly obtained by electrifying a resin in a melted state by application of voltage between a supply-side electrode and a collection-side electrode so as to extend the resin into an ultrafine composite fiber by electrospinning, and accumulating the ultrafine composite fiber, wherein the ultrafine composite fiber includes at least two polymeric components and the ultrafine composite fiber includes at least one type of composite fiber selected from a sea-island structure composite fiber and a core-sheath structure composite fiber as viewed in fiber cross section, at least one selected from an island component and a core component has a volume specific resistance of $10^{15}\Omega\cdot$cm or less, and at least one selected from a sea component and a sheath component has a volume specific resistance exceeding $10^{15}\Omega\cdot$cm.

With a composite of an electro conductive substrate and a fiber assembly according to the present invention, the electro conductive substrate is a collection-side electrode, and at least a part or all of the surface of the electro conductive substrate is covered and integrated, with the fiber assembly.

A method for producing a fiber assembly according to the present invention is a method in which a composite-resin-formed product in a solid or melted state is supplied to a supply-side electrode, and heated and melted in the case where the composite-resin-formed product is solid, and the melted resin is electrified by application of voltage between the supply-side electrode and a collection-side electrode, and extended into an ultrafine composite fiber by electrospinning, and the composite fiber is accumulated to obtain a fiber assembly, wherein the ultrafine composite fiber includes at least two polymeric components and the ultrafine composite fiber includes at least one type of composite fiber selected from a sea-island structure composite fiber and a core-sheath structure composite fiber as viewed in fiber cross section, at least one selected from an island component and a core component has a volume specific resistance of $10^{15}\Omega\cdot$cm or less, and at least one selected from a sea component and a sheath component has a volume specific resistance exceeding $10^{15}\Omega\cdot$cm.

A method for producing a composite of an electro conductive substrate and a fiber assembly according to the present invention is a method for producing a composite of an electro conductive substrate and a fiber assembly in which at least a part or all of the surface of the electro conductive substrate is covered and integrated with the fiber assembly, wherein when the electro conductive substrate is disposed on a collection-side electrode, a composite-resin-formed product in a solid or melted state is supplied to a supply-side electrode and heated and melted in the case where the composite-resin-formed product is solid, and the melted resin is electrified by application of voltage between the supply-side electrode and the collection-side electrode and extended into an ultrafine composite fiber by electrospinning, and the composite fiber is accumulated on the surface of the electro conductive substrate to obtain a fiber assembly in which the electro conductive substrate is covered and integrated with the fiber assembly, the ultrafine composite fiber includes at least two polymeric components and the ultrafine composite fiber includes at least one type of composite fiber selected from a sea-island structure composite fiber and a core-sheath structure composite fiber as viewed in fiber cross section, at least one selected from an island component and a core component has a volume specific resistance of $10^{15}\Omega\cdot$cm.

or less, and at least one selected from a sea component and a sheath component has a volume specific resistance exceeding $10^{15}\Omega\cdot$cm.

Effects of the Invention

According to the present invention, it is possible to obtain a fiber assembly by forming a composite-resin-formed product containing a combination of a component on which it is difficult to perform electrospinning and a component having a volume specific resistance less than or equal to a specific value into an ultrafine composite fiber by electrospinning without the use of any solvent or water as a spinning solution, and accumulating the ultrafine composite fiber. In addition, the component on which it is difficult to perform electrospinning, serving as a sea component and/or sheath component, is used as a thermally adhesive component to thermally bond portions of the ultrafine composite fiber, and it is therefore possible to obtain a fiber assembly having a high tensile strength and puncture strength, such as a thermally-bonded non-woven fabric. Even when the fiber assembly of the present invention is heat-treated, the composite fiber does not form a film and maintains its fibrous form. The fiber assembly of the present invention undergoes less thermal shrinkage than commonly used non-woven fabrics.

A composite of an electro conductive substrate and a fiber assembly according to the present invention is produced by electrospinning a composite-resin-formed product containing a combination of a component on which it is difficult to perform electrospinning and a component having a volume specific resistance less than or equal to a specific value into an ultrafine composite fiber, and covering and integrating at least a part or all of the surface of an electro conductive substrate with a fiber assembly made of the ultrafine composite fiber, so that the composite provides ease of handling and improved work efficiency when, for example, housing it in a battery.

MODES FOR CARRYING OUT THE INVENTION

Figure 1:
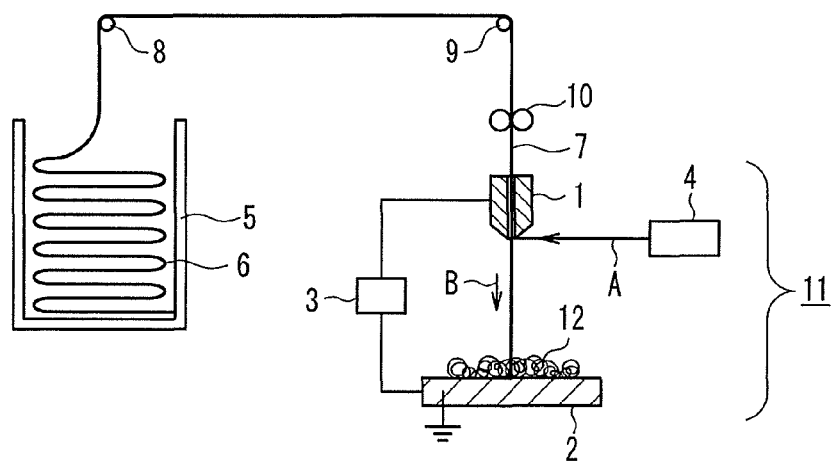
FIG. 1 is an illustrative schematic diagram of an electrospinning apparatus according to an embodiment of the present invention.

The fiber assembly of the present invention is a fiber assembly obtained by electrifying a resin in a melted state (hereinafter also referred to as a "composite-resin-formed product") by application of voltage between a supply-side electrode and a collection-side electrode so as to extend the resin into an ultrafine composite fiber by electrospinning, and accumulating the ultrafine composite fiber. Generally, in melt electrospinning as described above, the resin charged when it passes through the supply-side electrode is extended toward the collection-side electrode at a high speed by electrical attraction. Accordingly, resins having a volume specific resistance exceeding $10^{15} \Omega \cdot cm$ hardly can be charged, and thus it is difficult to electrospin such resins and they are not suitable for electrospinning. However, according to the present invention, even such a resin on which it is difficult to perform electrospinning having a high volume specific resistance can be extended by electrospinning due to the effect obtained by combining the resin on which it is difficult to perform electrospinning with a resin having a volume specific resistance of $10^{15} \Omega \cdot cm$ or less. This is presumably because when the composite-resin-formed product is heated and melted in advance of the supply-side electrode of the two electrodes and/or between the electrodes, the source fiber that is the composite-resin-formed product is near the supply-side electrode until it is electrified to a specific level or more, at the time of which, the configuration in the cross-section at the tip of the heated and melted source fiber is collapsed and alloying momentarily occurs, the component having a volume specific resistance less than or equal to a specific value that has been exposed at the surface is charged, under the influence of which spinning is carried out.

In the present invention, the composite-resin-formed product includes at least two polymeric components, and one of the polymeric components has a volume specific resistance of $10^{15} \Omega \cdot cm$ or less (hereinafter also referred to as a "first component"). This is because the composite-resin-formed product can be charged easily when it passes through the supply-side electrode. The volume specific resistance is preferably $10^6$ to $10^{14} \Omega \cdot cm$, and more preferably $10^7$ to $10^{14} \Omega \cdot cm$.

Even a polymer having a high volume specific resistance exceeding $10^{15} \Omega \cdot cm$ can be turned into a resin suitable for electrospinning by reducing the apparent volume specific resistance before electrospinning by any one or combination of the following processing methods: kneading the polymer with a masterbatch that reduces the volume specific resistance (for example, a masterbatch including a filler such as carbon and a metal salt); reducing the resistance of the resin by processes such as corona processing, fluorination processing or electret processing; and applying an oil that reduces the volume specific resistance (for example, an anionic surfactant, a cationic surfactant, a nonionic surfactant or the like) to the composite resin surface or impregnating it with the oil. In the case of resins, the volume specific resistance usually is measured according to ASTM D-257.

The apparent volume specific resistance as used herein refers to a value measured according to ASTM D-257, which generally is used to measure the volume specific resistance of a resin, using a sample obtained from a resin that has undergone the above processing methods). In other words, the apparent volume specific resistance is the volume specific resistance of a processed resin, rather than the volume specific resistance of a resin itself.

The content of the first component in the composite-resin-formed product is 10 mass % or mope, preferably 30 mass % or more, and more preferably 50 mass % or more. When the content falls within this range, it is possible to obtain an ultrafine composite fiber in a stable manner. With 10 mass % or more of the first component, even if a barely chargeable resin having a volume specific resistance exceeding $10^{15} \Omega \cdot cm$ is mixed, the resin can be electrospun and extended at the same time when the resin having a volume specific resistance of $10^{15} \Omega \cdot cm$ or less is charged and electrospun due to the influence thereof, and an ultrafine composite fiber can be formed. In terms of obtaining a stable composite-resin-formed product, the content of the first component in the composite-resin-formed product is preferably 90 mass % or less.

Even when a barely chargeable resin having a volume specific resistance exceeding $10^{15} \Omega \cdot cm$, such as an olefin (for example, polypropylene or polyethylene), is mixed with the composite-resin-formed product, as long as a resin having a volume specific resistance of $10^{15} \Omega \cdot cm$ or less is mixed in an amount of 10 mass % or more, good electrospinning is possible. Specifically, in the case where a resin having a volume specific resistance of $10^{16} \Omega \cdot cm$ or more, such as an olefin, and a resin having a volume specific resistance of $10^{15} \Omega \cdot cm$ or less are used, the content of the resin having a volume specific resistance of $10^{15} \Omega \cdot cm$ or less is preferably 10 to 90 mass %, and more preferably 30 to 70 mass %. If the content of the resin having a volume specific resistance of $10^{15} \Omega \cdot cm$ or less is 10 mass % or more, the resin easily can be processed into an ultrafine fiber in the manner as described above. If, on the other hand, the content of the resin having a volume specific resistance of $10^{15} \Omega \cdot cm$ or less is 90 mass % or less, a stable composite-resin-formed product can be obtained.

Examples of the polymer having a volume specific resistance of $10^{15} \Omega \cdot cm$ or less include, but are not particularly limited to, an ethylene vinyl alcohol (hereinafter also referred to as "EVOH") copolymer, a polyester such as polyethylene terephthalate, nylon, and polyurethane. Among them, it is preferable to use EVOH because it can be highly charged and extended significantly by electrospinning. The EVOH preferably has a volume specific resistance of $10^6$ to $10^{15} \Omega \cdot cm$, more preferably $10^7$ to $10^9 \Omega \cdot cm$, and even more preferably $10^{7.5}$ to $10^{8.5} \Omega \cdot cm$.

The EVOH mentioned above can be obtained by saponifying an ethylene vinyl acetate copolymer. Although there is no particular limitation on the ethylene content, the EVOH generally contains 29 to 47 mol % of ethylene. It is commercially available as EVAL (trade name) from Kuraray Co., Ltd., as SOARNOL (trade name) from Nippon Synthetic Chemical Industry Co., Ltd., and the like, and any commercially available EVOH can be used in the present invention. The melting point of EVOH varies depending on the ethylene content and the vinyl alcohol content of the EVOH. The melting point is 171° C. in the case where, for example, ethylene is contained in an amount of 38 mol %. It is also possible to select and use EVOHs having different ethylene contents as appropriate depending on the combination with other component contained in the composite-resin-formed-product.

The first component only needs to have a volume specific resistance of $10^{15} \Omega \cdot cm$ or less, and the first component preferably has, but is not particularly limited to, a melting point of 100 to 300° C., and more preferably 120 to 200° C.

In the present invention, the composite-resin-formed product contains, in addition to the first component described above, a polymeric component having a volume specific resistance exceeding $10^{15} \Omega \cdot cm$ thereinafter referred to as a "second component"). The second component can be any polymeric component having a volume specific resistance exceeding $10^{15} \Omega \cdot cm$, and examples include, but are not particularly limited to, polyolefins such as polyethylene, polypropylene and polybutene, and polystyrene, and an ethylene-propylene copolymer. Among them, polyethylene, an ethylene-propylene copolymer and the like are preferable in terms of thermal adhesiveness. Incidentally, a low-density polyethylene, a high-density polyethylene, and homopolymers and copolymers of polypropylene have a melting point of 98 to 115° C., 130 to 137° C., 160 to 175° C. and 150 to 175° C., respectively ("Plastic Databook" edited by "Plastic" Editorial Department, Asahi Kasei Amidas Corporation, published on Dec. 1, 1999, Kogyo Chosakai Publishing Co., Ltd., pages 7 and 8).

As the second component, it, is preferable to use a polymeric component having a melting point of 70 to 180° C. When a polymeric component having a melting point of 70° C. or more is used as the second component, it is easy to obtain an ultrafine composite fiber in a stable manner. When a polymeric component having a melting point of 180° C. or less is used, it is assumed that good electrospinnability is obtained because the configuration in the cross-section at the tip of the source fiber easily can be collapsed and alloying momentarily occurs and thus the first component easily can be exposed at the fiber surface when the source fiber is heated and melted in advance of the supply-side electrode and/or between the electrodes. Furthermore, as a result of having a low melting point, good adhesiveness can be provided when portions of the fiber are thermally bonded. From the viewpoint of obtaining these effects more significantly, it is more preferable that the second component has a melting point of 90 to 160° C., and even more preferably 100 to 140° C.

As the second component, it is preferable to use a polymeric component having a melting point lower than that of the first component by at least 10° C. This configuration enables portions of the fiber to be thermally bonded by thermal adhesion of the second component and to be processed into a sheet form, as a result of which a fiber assembly having a high tensile strength and puncture strength, such as a thermally-bonded non-woven fabric, can be obtained. The fiber assembly will not form a film when it is subjected to a heat treatment as long as the heat treatment is carried out at a temperature less than the melting point, of the island component and/or core component because only the sea component and/or sheath component undergoes thermal adhesion and the island component and/or core component can maintain its fibrous form. The fiber assembly undergoes less thermal shrinkage than commonly used non-woven fabrics. From the viewpoint of obtaining these effects more significantly; it is more preferable to use a polymeric component having a melting point lower than that of the first component by at least 20° C. as the second component.

General-purpose resins such as polyethylene, polypropylene, polybutene and an ethylene-propylene copolymer are commercially manufactured by various manufacturers, and any resin can be selected from commercially available resins as appropriate and used taking into consideration the melting point and the like of the first component.

In the present invention, the composite-resin-formed product only needs to be in a melted state when it is electrified. The state of the composite-resin-formed product when supplied is preferably, but not particularly limited to, a solid state or a melted state. When the composite-resin-formed product is supplied in a solid state, an ultrafine composite fiber containing at least two polymeric components can be obtained easily. On the other hand, when the composite-resin-formed product is supplied in a melted state, the composite-resin-formed product can be charged easily, and thus an ultrafine composite fiber containing at least two polymeric components can be obtained easily. More preferably, the composite-resin-formed product is in a fibrous state. As used herein, the fibrous state encompasses not only a fiber or filament in a solid state, but also a fiber or filament in a melted state. When the composite-resin-formed product is in a fibrous state, the ultrafine composite fiber is likely to have a cross section similar to the cross section of the composite-resin-farmed product in a fibrous state, and it is therefore easy to control the configuration of the cross-section of the ultrafine composite fiber resulting from electrospinning. In the case where portions of the ultrafine composite fiber are thermally bonded, which will be described later, the composite-resin-formed product is preferably a sea-island structure and/or core-sheath structure composite fiber as viewed in fiber cross section, from the viewpoint, of easily obtaining a sea-island structure and/or core-sheath structure composite fiber as the ultrafine composite fiber. The composite-resin-formed product in a fibrous state (hereinafter also referred to as a "source composite fiber") is preferably a monofilament, a multifilament or tow made up of a bundle of a plurality of monofilaments. The multifilament refers to a fiber made up of 2 to 100 filaments, and the tow refers to a fiber made up of more than 100 filaments. Among them, it is preferable to use a multifilament or tow made up of a bundle of 10 to 1000 monofilaments in terms of electrospinnability. As an alternative, it is also possible to connect a melt-spinning machine, provided in advance of the electrospinning apparatus, directly to the electrospinning apparatus, and perform spinning by electrifying the filament in a melted state.

In the present invention, the source composite fiber that serves as the composite-resin-formed product preferably has a sea-island structure and/or core-sheath structure as viewed in fiber cross section: the first component is an island component and/or core component, and the second component is a sea component and/or sheath component. More preferably, the source composite fiber has a sea-island structure as viewed in fiber cross section. When the source composite fiber has a sea-island structure, the island component is scattered, and thus it is assumed that good electrospinnability is obtained because the configuration in the cross-section at the tip of the source fiber easily can be collapsed and alloying momentarily occurs and thus the first component easily can be exposed at the fiber surface when the source fiber is heated and melted in advance of the supply-side electrode and/or between the electrodes. From the viewpoint of significantly obtaining this effect, it is more preferable that, in the sea-island structure source composite fiber, the number of island component segments per sea-island structure source composite fiber is 15 to 70.

Figure 6:
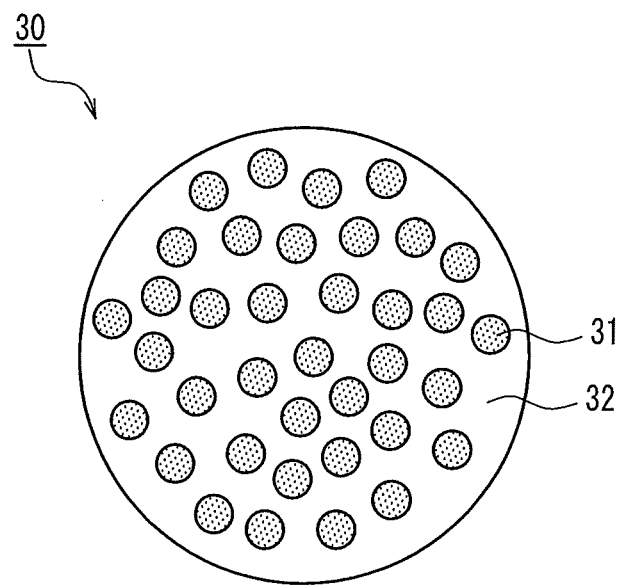
FIG. 6 is a schematic diagram showing a cross section of an ultrafine composite fiber according to an embodiment of the present invention.
Figure 7:
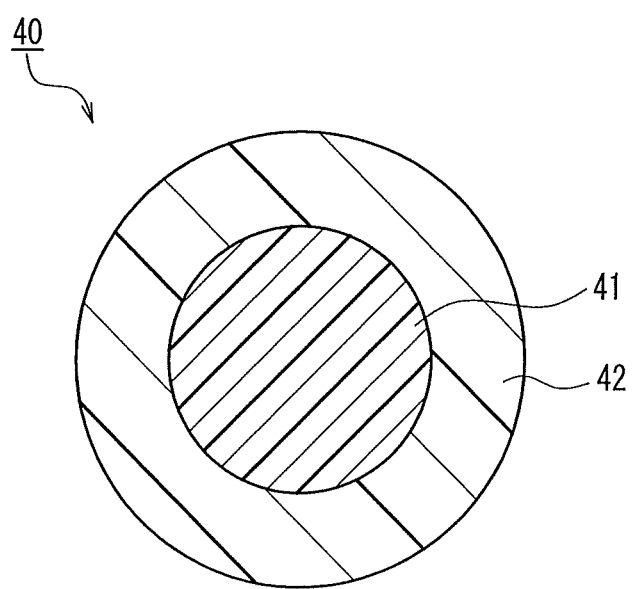
FIG. 7 is a schematic diagram showing a cross section of an ultrafine composite fiber according to another embodiment of the present invention.

In the present invention, the composite-resin-formed product is heated and melted in advance of the supply-side electrode of the two electrodes and/or between the electrodes and extended by electrospinning to form an ultrafine composite fiber. The ultrafine composite fiber contains a sea-island structure and/or core-sheath structure composite fiber as viewed in fiber cross section. The ultrafine composite fiber may take a configuration of an alloy-like cross section or a configuration in which the sea component (sheath component) and the island component (core component) are inverted, through the process of extending the composite-resin-formed product by electrospinning. In this case as well, the ultrafine composite fiber of the present invention contains 10 mass % or more of the sea-island structure and/or core-sheath structure composite fiber as viewed in fiber cross section. The ultra-fine composite fiber preferably contains 50 mass % or more of the sea-island structure and/or core-sheath structure composite fiber. More preferably, the ultrafine composite fiber is made of 100 mass % of the sea-island structure and/or core-sheath structure composite fiber. The sea-island structure and/or core-sheath structure composite fiber of the ultrafine composite fiber may have a non-circular shape such as a polygonal, elliptical or irregular shape. In the case of the source composite fiber being a multifilament or tow, an ultrafine fiber may be obtained that has a cross-sectional configuration in which the multifilament or tow appears as a single fiber. The sea-island structure and/or core-sheath structure composite fiber as used in the present invention encompasses an ultrafine fiber having such a cross-sectional configuration. In the case of using, for example, a tow made up of a bundle of 600 core-sheath structure composite fibers as the source composite fiber, a sea-island structure composite fiber may be obtained that appears to have 600 island component segments. The first component can be an island component and/or core component, and the second component can be a sea component and/or sheath component. The content of the island component and/or core component in the ultrafine composite fiber is 10 mass % or more, preferably 30 mass % or more, and more preferably 50 mass % or more. In the ultrafine composite fiber, the sea component and/or sheath component preferably has a melting point lower than the melting point of the island component and/or core component by at least 10° C. because portions of the ultrafine composite fiber can be readily thermally bonded in the subsequent heat treatment. FIG. 6 shows a schematic cross-sectional view of a sea-island structure composite fiber, and FIG. 7 shows a schematic cross-sectional view of a core-sheath structure composite fiber.

In the present invention, voltage is applied between the two electrodes, namely, the supply-side electrode and the collection-side electrode. The applied voltage is preferably 20 to 100 kV, and more preferably 30 to 50 kV. If the applied voltage is 20 kV or more, the resin will be charged easily because resistance between the electrodes in the space in the atmosphere (between the electrodes) is low and electrons flow smoothly. If the applied voltage is 100 kV or less, a spark will not occur between the electrodes, and thus there is no possibility that the resin might catch on fire.

The distance between the electrodes is preferably 2 to 25 cm, and more preferably 5 to 20 cm. Ti the distance between the electrodes is 2 cm or more, a spark will not occur between the electrodes, and thus there is no possibility that the resin might catch on fire. If the distance between the electrodes is 25 cm or less, the resin will be charged easily because electrons flow smoothly with little resistance between the electrodes.

When supplied to the supply-side electrode, the composite-resin-formed product may be supplied in a solid state or a melted state. For example, the composite-resin-formed product is supplied in a fibrous state (as a source composite fiber). In the case of the composite-resin-formed product being in a solid state, for example, the composite-resin-formed product may be supplied using a guiding roll. On the other hand, when the composite-resin-formed product passes through the supply-side electrode, it may be heated to a melted or semi-melted (softened) state. In the case of the composite-resin-formed product being in a melted state, for example, it can be supplied by its own weight, a pressing force applied from upstream, or injection of a high pressure air stream. Among them, from the viewpoint of easy adjustment of the degree of melting, it is preferable to provide a melt-spinning machine in advance of the electrospinning apparatus and supply the composite-resin-formed product in a melted state by compression of the resin extruded from the melt-spinning machine.

The composite-resin-formed product (for example, source composite fiber) is irradiated with, for example, laser beams or infrared rays immediately after the composite-resin-formed product passes through the supply-side electrode so as to heat and melt the composite-resin-formed product. The composite-resin-formed product is preferably a sea-island structure and/or core-sheath structure composite fiber as viewed in fiber cross section. In the case of supplying the composite-resin-formed product in a melted state, or even in the case of supplying the composite-resin-formed product in a solid state and then heating the composite-resin-formed product into a melted state or semi-melted state, by further heating and melting the composite-resin-formed product between the electrodes, the composite-resin-formed product can be made to have a low viscosity, enhancing the extension capability. Here, an example of laser beam irradiation will be described. Laser beams include laser beams generated from a light source such as a YAG laser, a carbon dioxide ($CO_2$) gas laser, an argon laser, an excimer laser, or a helium-cadmium laser. Among them, it is preferable to use laser beams from a carbon dioxide gas laser in terms of high power source efficiency and high melting capability for the composite fiber. The laser beams have a wavelength of, for example, 200 nm to 20 μm, preferably 500 nm to 18 μm, more preferably 1 to 16 μm, and even more preferably 5 to 15 μm. Examples of the laser beam irradiation method include, but are not particularly limited to, a method in which an object is irradiated with spot laser beams, or a method in which laser beams are reflected off a reflection board, and the reflection board is controlled so that an object is irradiated with the laser beams linearly or planarly. Among them, the spot laser beam irradiation is preferred because the source composite fiber can be irradiated locally. The beam diameter of the spot laser beams can be selected according to the form of the source composite fiber. Specifically, the beam diameter can be, in the case of the resin being linear (for example, a monofilament, a multifilament, a tow or the like), for example, any diameter as long as it is larger than the average diameter of the linear resin: for example, 0.5 to 30 mm, preferably 1 to 20 mm, more preferably 2 to 15 mm, and even more preferably approximately 3 to 10 mm. As for the ratio of the average diameter of the linear resin to the beam diameter, the beam diameter can be approximately 1 to 100 times the average diameter of the linear resin, preferably 2 to 50 times, more preferably 3 to 30 times, and even more preferably approximately 5 to 20 times.

In the case of irradiating the composite-resin-formed product with the laser beams after the composite-resin-formed product passes through the supply-side electrode so as to heat and melt the composite-resin-formed product, the distance between the end of the supply-side electrode from which the resin-formed product is extruded and a section of the resin-formed product irradiated with the laser beams is preferably 1 to 6 mm, and more preferably 2 to 4 mm. If the distance is 1 mm or more, the laser beam irradiation section will not be too close to the electrode, the electrode temperature will not be high, and the resin will not be decomposed. If, on the other hand, the distance is 6 mm or less, the amount of charge of the resin-formed product charged when the resin-formed product passes through the supply-side electrode will not be attenuated, and when the section is heated and melted with laser beams, the resin in a melted state easily can be extended toward the collection-side electrode.

The laser beam output necessary to melt the composite-resin-formed product so as be capable of extension can be controlled such that the temperature is greater than or equal to the melting point of the first component constituting the composite-resin-formed product but does not cause any of the resins constituting the composite-resin-formed product to be ignited or decomposed. In short, control can be performed such that the composite-resin-formed product becomes viscous. The heating temperature to make the composite-resin-formed product viscous varies depending on the supply speed of the composite-resin-formed product, the laser beam output, the distance between the laser and the composite-resin-formed product, and the thickness of the composite-resin-formed product, In the case of laser beams, for example, the heating temperature is preferably 160 to 1200° C., and more preferably 600 to 800° C. If the heating temperature is 160° C. or more, the amount of heat that heats the composite-resin-formed product is sufficient, and thus the composite-resin-formed product can be well melted, easily become viscous, and easily formed into an ultrafine fiber. If the heating temperature is 1200° C. or less, the resin will not be ignited or decomposed, and thus the resin can be well formed into a fiber. A specific laser beam output can be selected as appropriate according to the physical property value (melting point), form, thickness and supply speed of the composite-resin-formed product used, and the like. The laser beam output can be, for example, 3 to 100 mA, preferably 3 to 50 mA, and more preferably approximately 6 to 40 mA. If the laser beam output is less than 3 mA, the irradiation conditions of laser beams to heat the resin into a melted state may be controlled based on the melting point of the composite-resin-formed product, but in the case where the composite-resin-formed product is linear and has a small diameter, and high voltage is applied, the conditions are preferably controlled by the laser beam output in terms of convenience. The composite-resin-formed product may be irradiated with laser beams from one or more locations from the periphery of the composite-resin-formed product.

The composite-resin-formed product melted so as to be capable of extension is extended toward the collection-side electrode due to electrical attraction, forming an ultrafine composite fiber. The extension ratio at this time is 100 to 1000 times, preferably 200 to 800 times, and more preferably approximately 300 to 500 times. The composite-resin-formed product is formed into an ultrafine fiber by being extended with such an extension ratio. In the present invention, the ultrafine composite fiber preferably has a fiber diameter of 0.3 to 10 µm, more preferably 0.8 to 5 µm, even more preferably 3 µm or less, and still more preferably 1 µm or less.

The fiber diameter is determined from fiber diameter in the case of a fiber having a circular cross-section. The fiber diameter is measured from the fiber cross section or fiber side face. In the case of a fiber having a non-circular cross section such as a polygonal, elliptical, hollow, C-shaped, Y-shaped, X-shaped or irregular cross section, the fiber cross-sectional shape is assumed to be a circle having a uniform area, and the fiber diameter is determined by measuring the diameter of the circle. Accordingly, in the case of the non-circular cross section fiber, the fiber diameter cannot be determined from the fiber side face.

The ultrafine composite fiber is accumulated on the collection-side electrode to give a fiber assembly. The fiber assembly may be taken directly from the collection-side electrode. Alternatively, it is also possible to provide a collection-side electrode having a conveyer configuration so that by continuously moving the accumulation position, a fiber assembly in a sheet form can be produced continuously Another method for obtaining a fiber assembly is to dispose a metal mesh, a woven fabric, a nonwoven fabric, a sheet of paper or the like on the collection-side electrode, and accumulate the ultrafine composite fiber on the sheet-form material, thereby giving a layered structure fiber assembly. Still alternatively, the ultrafine composite fiber may be accumulated on a non-sheet-form material having a specific thickness such as a cartridge type filter.

The material to be accumulated preferably is grounded to eliminate the potential difference with the collection-side electrode. If no problem arises in terms of production, the material to be accumulated does not need to be grounded, and may be held at a short distance from the collection-side electrode.

In the fiber assembly, portions of the ultrafine composite fiber are preferably thermally bonded. Thermal bonding of portions of the ultrafine composite fiber can be performed with, but is not particularly limited to, a heat treatment as described below.

The fiber assembly preferably is created in a sheet form in which portions of the ultrafine composite fiber are thermally bonded by thermal adhesion of the sheath component and/or sea component. For example, a heat treatment at a temperature lower than or equal to the melting point of the island component and/or core component can cause thermal adhesion of the sheath component and/or sea component and provide a thermally-bonded non-woven fabric in which portions of the ultrafine composite fiber have been thermally bonded. Examples of the heat treatment include, but are not particularly limited to, drying methods such as an air-through dryer (hot air circulation method) and a cylinder dryer (hot-plate press-bonding method). In terms of thermal shrinkage, preferably, the drying temperature is 70 to 180° C., and the drying time is 5 seconds to 30 minutes.

The thermally-bonded non-woven fabric preferably has a mass per unit area of 0.5 to 200 $g/m^2$, and more preferably 1.0 to 150 $g/m^2$. If the mass per unit area is 0.5 $g/m^2$ or more, rupture of the web will not occur. If, on the other hand, the mass per unit area is 150 $g/m^2$ or less, the fiber collection can be carried out in a stable manner. The mass per unit area of the non-woven fabric as used herein refers to a mass per unit area measured according to JIS L 1906 (2000).

The thermally-bonded non-woven fabric preferably has a thickness of 1 to 300 μm, and more preferably 5 to 200 μm. If the thickness is 1 μm or more, rupture of the web will not occur. If, on the other hand, the thickness is 300 μm or less, the fiber collection can be carried out in a stable manner. The thickness of the non-woven fabric as used herein refers to a thickness measured according to JIS B 7502.

The thermally-bonded non-woven fabric preferably has a thermal shrinkage of 5.0% or less, and more preferably 3.0% or less. If the thermal shrinkage is 5.0% or less, the thermally-bonded non-woven fabric will have good dimensional stability during heat treatment and it is easy to handle. The thermal shrinkage of the non-woven fabric as used herein refers to a thermal shrinkage measured according to JIS L 1906 5.9.1. Ordinary non-woven fabrics including hydroentangled non-woven fabrics and needle-punched non-woven fabrics are likely to undergo thermal shrinkage of approximately 6 to 10% when subjected to a heat treatment. The thermally-bonded non-woven fabric of the present invention, however, has a smaller thermal shrinkage than ordinary non-woven fabrics, and thus excellent handling properties can be obtained.

The thermally-bonded non-woven fabric preferably has a tensile strength of 10 N/5 cm or more, and more preferably 20 N/5 cm or more. If the tensile strength is 10 N/5 cm or more, rupture caused by the line tension or the like during processing of the non-woven fabric will not occur, and thus excellent handling properties can be obtained. The tensile strength of the non-woven fabric as used herein refers to a tensile strength measured according to JIS L 1096 6.12.1 (strip method).

The thermally-bonded non-woven fabric preferably has a puncture strength of 50 gf or more, and more preferably 100 gf or more. If the puncture strength is 50 gf or more, the thermally-bonded non-woven fabric can be used suitably in fields that require puncture strength, for example, as a battery separator, a wrapping material or the like. As used herein, the puncture strength of the non-woven fabric refers to a measured load (gf) at which defects such as holes are formed in a non-woven fabric by setting the non-woven fabric to a 25 mmϕ fixed frame and penetrating it with a puncture needle having a tip radius of 1 mmϕ at a speed of 100 mm/min.

The thermally-bonded non-woven fabric preferably has an air permeability of 0.1 to 20 s/100 cc, and more preferably 0.2 to 150 s/100 cc. If the air permeability is within the range of 0.1 to 20 s/100 cc, the fiber assembly can be used suitably in fields that require air permeability, for example, as a filter, a mask or the like. The air permeability of the nonwoven fabric as used herein refers to an air permeability measured according to JIS P 8117.

In the thermally-bonded non-woven fabric, it is preferable that the ultrafine composite fiber maintains the fibrous form, and micropores are formed between portions of the ultrafine composite fiber. The micropores preferably have an average pore size of 10 μm or less, and more preferably 5 μm or less. If the average pore size is 10 μm or less, the thermally-bonded non-woven fabric can be suitably used as a filter or battery separator. The micropores preferably have a maximum pore size of 10 μm or less. If the average pore size is too small, ions cannot migrate smoothly when the thermally-bonded non-woven fabric is used as, for example, a battery separator. If the average pore size is too large, ions will migrate excessively, and thus a too large average pore size is not appropriate. The average pore size (mean flow pore diameter) and the maximum pore size (bubble point pore diameter) as used herein are measured by a bubble point method according to ASTM F 316 86.

As described above, the thermally-bonded non-woven fabric of the present invention has an excellent tensile strength and puncture strength. Also, in the thermally-bonded non-woven fabric, the ultrafine composite fiber maintains the fibrous form. Furthermore, the thermally-bonded non-woven fabric of the present invention undergoes little thermal shrinkage. Accordingly the thermally-bonded non-woven fabric of the present invention is very useful as a filter or a battery separator in, for example, a lithium ion battery or the like.

A composite of an electro conductive substrate and a fiber assembly (hereinafter also referred to simply as a "composite") according to the present invention is obtained by disposing an electro conductive substrate on the collection-side electrode, accumulating an ultrafine composite fiber on the surface of the electro conductive substrate by electrospinning, and covering and integrating the surface of the electro conductive substrate with a fiber assembly made of the ultrafine composite fiber.

There is no particular limitation on the electro conductive substrate, and any material can be used as long as it can be disposed on the collection-side electrode during electrospinning, such as a metal, a metal oxide, carbon, graphite, or a battery electrode in which a conductive material has been fixed on the surface of a metal foil. The electro conductive substrate can take any form such as a foil, a sheet, a plate, a mesh or a linear form.

When the fiber assembly is used as a battery separator, it is preferable that the first component has a melting point ranging from 100 to 300° C., the second component has a melting point ranging from 70 to 180° C., and the melting point of the second component is lower than the melting point of the first component by at least 10° C. This is done so to, in the event that the chemical reaction within the battery becomes active and a thermal runaway occurs, cause the second component to melt to fill the micropore spaces between fibers, thereby suppressing the thermal runaway. In order to implement such an action and function, it is preferable to use, for example, EVOH having a melting point of 171° C. as the first component and an olefin polymer having a melting point of 120 to 160° C. as the second component.

A method for producing a fiber assembly according to the present invention will be described with reference to the drawings. FIG. 1 is an illustrative schematic diagram of an electrospinning apparatus according to an embodiment of the present invention. In the electrospinning apparatus 11, voltage is applied between a supply-side electrode 1 and a collection-side electrode 2 by a voltage generator 3, and a laser irradiation device 4 projects laser beams along the arrow A immediately below the supply-side electrode 1. A source composite fiber 7 is drawn out of a fiber deposit 6 placed in a container 5, passes through guides 8 and 9, and is supplied to the electrospinning apparatus 11 via feed rollers 10. The source composite fiber may be supplied from a yarn winding body wound on a bobbin. The source composite fiber 7 is charged when it passes through the supply-side electrode. The charged source composite fiber 7 is irradiated with laser beams projected along the arrow A from the laser irradiation device 4 immediately below the supply-side electrode 1, whereby the source composite fiber 7 is heated and melted, and extended toward the collection-side electrode due to electrical attraction. At this time, the source composite fiber 7 is extended in the direction indicated by the arrow B and formed into an ultrafine composite fiber. Reference numeral 12 indicates a fiber assembly that is an accumulation of the ultrafine composite fiber.

Figure 2:
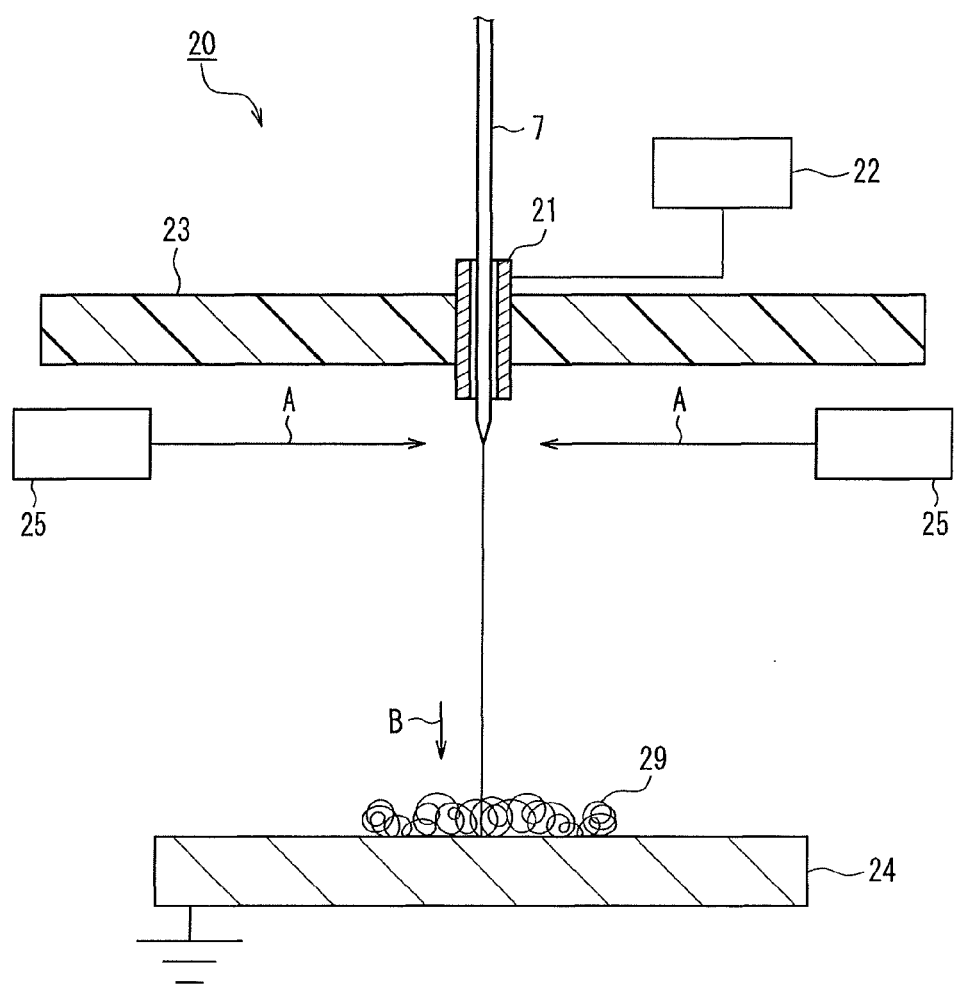
FIG. 2 is an illustrative schematic diagram of an electrospinning apparatus according to another embodiment of the present invention.

FIG. 2 is an illustrative schematic diagram of an electrospinning apparatus according to another embodiment of the present invention. The electrospinning apparatus 20 applies, with the use of a high voltage terminal 22, voltage to a supply-side electrode 21 attached to a polyimide resin plate 23. The supply-side electrode preferably has a needle shape. The needle-shaped electrode preferably has a needle length of 5 to 30 mm, and more preferably 10 to 20 mm. If the needle length is less than 5 mm, the direction to which the source composite fiber is extruded will not be uniform, and it tends to be difficult to guide the source composite fiber to the laser beam irradiation section. If, on the other hand, the needle length exceeds 30 mm, there is a possibility that the source composite fiber might not be extruded smoothly during extrusion due to resistance to the source composite fiber passing through the needle. The needle preferably has an inner diameter of 10 to 2000 μm, and more preferably 20 to 1650 μm. If the inner diameter is less than 10 μm, the number of fibers processed is reduced, and it tends to be difficult to send the source composite fiber through the needle due to the small inner diameter. If, on the other hand, the inner diameter exceeds 2000 μm, it tends to be difficult to charge the inside of the fiber. The needle-shaped electrode is not necessarily a single needle, and in the case of electrospinning large amounts of a source composite fiber at once, it is preferable to use a bundle of a plurality of thin needles, rather than a single thick needle because the source composite fiber can be guided easily to the laser beam irradiation section. The number of needles is preferably 1 to 1000, and more preferably 1 to 300. A collection-side electrode 24 is grounded. A plurality of laser irradiation devices 25 project laser beams along the arrows A immediately below the supply-side electrode 21. The source composite fiber 7 is charged when it passes through the supply-side electrode 21. The charged source composite fiber 7 is irradiated with laser beams projected along the arrows A from the laser irradiation devices 25 immediately below the supply-side electrode 21, whereby the source composite fiber 7 is heated and melted, extended toward the collection-side electrode 24 due to electrical attraction, and formed into an ultrafine fiber. At this time, the source composite fiber 7 is extended to, for example, several hundreds times the original length in a direction indicated by the arrow B, and formed into an ultrafine composite fiber. Reference numeral 29 indicates a fiber assembly that is an accumulation of the ultrafine composite fiber. A heating/extension region may be provided between the supply-side electrode and the collection-side electrode. In the heating/extension region, heat is conveyed from a heater such as an electric heater or a heating system such as an oil bath to heat the heating/extension region, in order to prevent the fiber from being cooled rapidly when, for example, the temperature becomes lower as the fiber gets closer to the collection-side electrode after the laser irradiation section, or when the resin starts to crystallize during extension, making it difficult create a thin fiber. The temperature of the heating/extension region is preferably higher than or equal to the glass transition temperature of the source composite fiber and lower than or equal to the melting point thereof although it varies depending on the type of source composite fiber. Specifically, the temperature of the heating/extension region is preferably 50 to 300° C., and more preferably 100 to 200° C. The heating method is preferably a method that uses electricity because it enables fine temperature adjustment.

Figure 3:
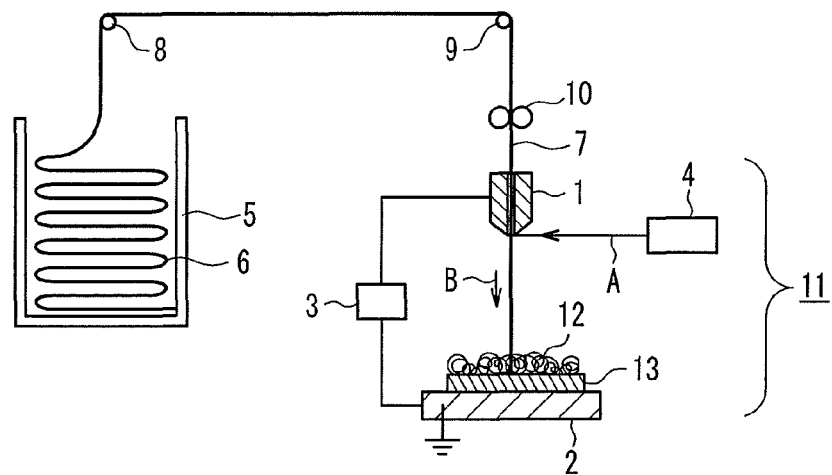
FIG. 3 is an illustrative schematic diagram of an electrospinning apparatus according to another embodiment of the present invention.

Next, a method for producing the composite of an electro conductive substrate and a fiber assembly described above will be described. FIG. 3 is an illustrative schematic diagram of an electrospinning apparatus according to an embodiment of the present invention. The electrospinning apparatus 11 applies voltage between a supply-side electrode 1 and a collection-side electrode 2 with the use of a voltage generator 3, and a laser irradiation device 4 projects laser beams along the arrow A immediately below the supply-side electrode 1. The source composite fiber 7 is drawn out of a collection of source fibers 6 placed in a container 5, passes through guides 8 and 9, and is supplied to the electrospinning apparatus 11 via feed rollers 10. The source composite fiber may be supplied from a yarn winding body wound on a bobbin. An electro conductive substrate 13 is disposed on the collection-side electrode 2. The source composite fiber 7 is charged when it passes through the supply-side electrode 1. The charged source composite fiber 7 is irradiated with laser beams projected along the arrow A from the laser irradiation device 4 immediately below the supply-side electrode 1, whereby the source composite fiber 7 is heated and melted, and extended toward the electro conductive substrate 13 due to electrical attraction. At this time, the source composite fiber 7 is extended in a direction indicated by the arrow B and formed into an ultrafine composite fiber. Reference numeral 12 indicates a fiber assembly that is an accumulation of the ultrafine composite fiber, and at least a part or all of the surface of the electro conductive substrate 13 is covered and integrated with the fiber assembly.

Figure 4:
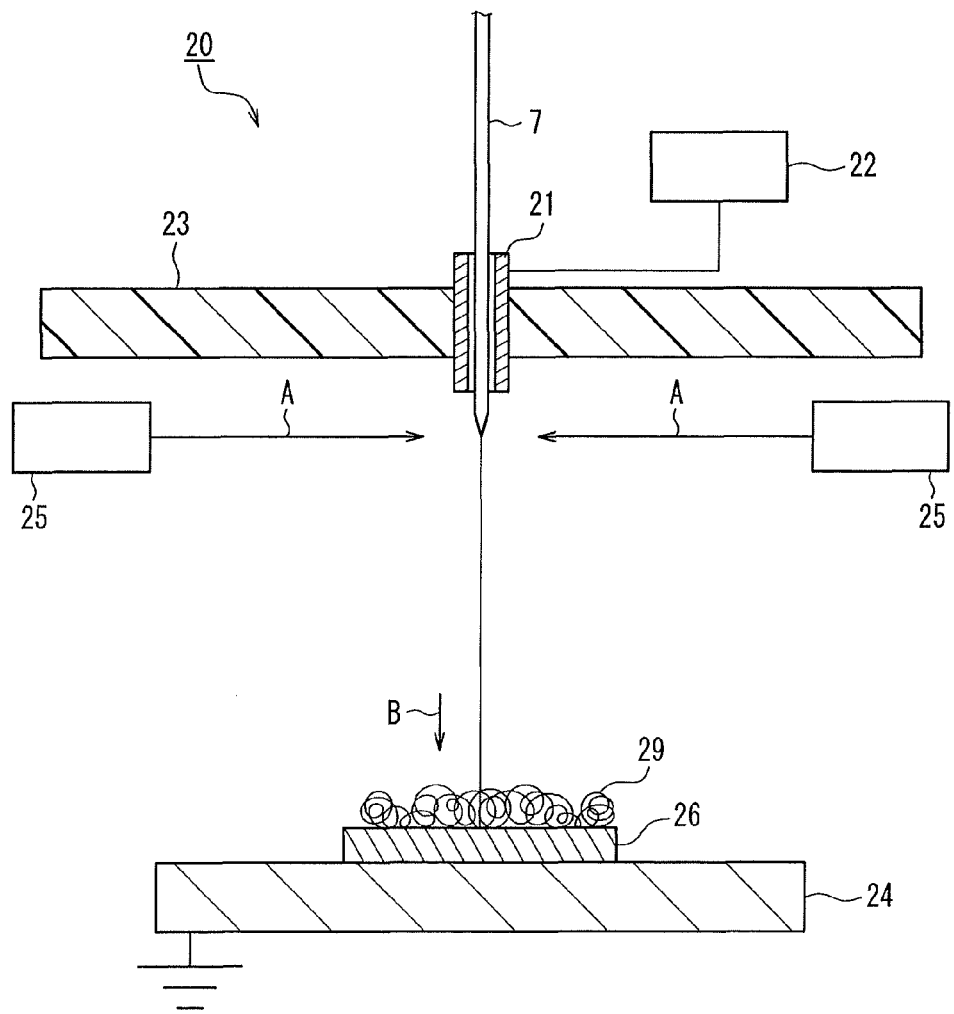
FIG. 4 is an illustrative schematic diagram of an electrospinning apparatus according to still another embodiment of the present invention.

FIG. 4 is an illustrative schematic diagram of an electrospinning apparatus according to another embodiment of the present invention. The electrospinning apparatus 20 applies, with the use of a high voltage terminal 22, voltage to a supply-side electrode 21 attached to a polyimide resin plate 23. The supply-side electrode preferably has a needle shape. The needle-shaped electrode preferably has a needle length of 5 to 30 mm, and more preferably 10 to 20 mm. If the needle length is less than 5 mm, the direction to which the source composite fiber is extruded will not be uniform, and it tends to be difficult to guide the source composite fiber to the laser beam irradiation section. If, on the other hand, the needle length exceeds 30 mm, there is a possibility that the source composite fiber might not be extruded smoothly during extrusion due to resistance to the source composite fiber passing through the needle. The needle preferably has an inner diameter of 10 to 2000 μm, and more preferably 20 to 1650 μm if the inner diameter is less than 10 μm, the number of fibers processed is reduced, and it tends to be difficult to send the source composite fiber through the needle due to the small inner diameter. If, on the other hand, the inner diameter exceeds 2000 μm, it tends to be difficult to charge the inside of the fiber. The needle-shaped electrode is necessarily a single needle, and in the case of electrospinning a large amounts of a source composite fiber at once, it is preferable to use a bundle of a plurality of thin needles, rather than a single thick needle because the source composite fiber can be easily guided to the laser beam irradiation section. The number of needles is preferably 1 to 1000, and more preferably 1 to 300. A collection-side electrode 24 is grounded. A plurality of laser irradiation devices 25 project laser beams along the arrows A immediately below the supply-side electrode 21. An electro conductive substrate 26 is disposed on the collection-side electrode 24. The source composite fiber 7 is charged when it passes through the supply-side electrode 21. The charged source composite fiber 7 is irradiated with laser beams projected along the arrows A from the laser irradiation devices 25 immediately below the supply-side electrode 21, whereby the source composite fiber 7 is heated and melted, extended toward the electro conductive substrate 26, and formed into an ultrafine composite fiber. At this time, the source composite fiber 7 is extended to, for example, several hundreds times the original length in a direction indicated by the arrow B, and formed into an ultrafine composite fiber. Reference numeral 29 indicates a fiber assembly that is an accumulation of the ultrafine composite fiber, and at least a part or all of the surface of the electro conductive substrate 26 is covered and integrated with the fiber assembly A heating/extension region may be provided between the supply-side electrode and the collection-side electrode. In the heating/extension region, heat is conveyed from a heater such as an electric heater or a heating means such as an oil bath to heat the heating/extension region, in order to prevent the fiber from being cooled rapidly when, for example, the temperature becomes lower as the fiber gets closer to the collection-side electrode after the laser irradiation section, or when the resin starts to crystallize during extension, making it difficult create a thin fiber. The temperature of the heating/extension region is preferably higher than or equal to the glass transition temperature of the source composite fiber and lower than or equal to the melting point thereof although it varies depending on the type of source composite fiber. Specifically, the temperature of the heating/extension region is preferably 50 to 300° C., and more preferably 100 to 200° C. The heating method is preferably a method that uses electricity because it enables fine temperature adjustment.

Figure 13:
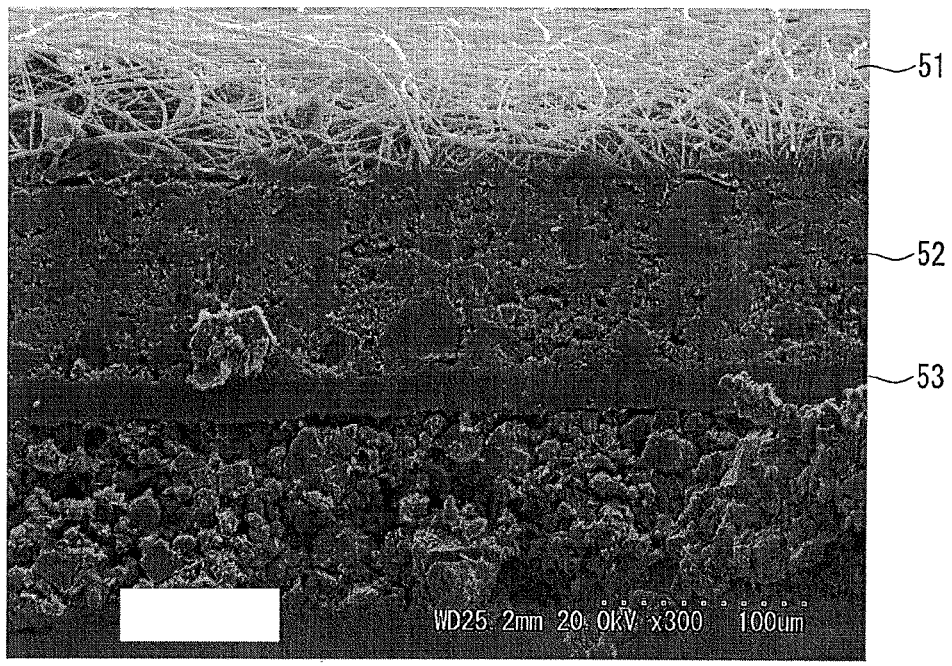
FIG. 13 is a scanning electron micrograph (SEM, magnified 300 times) of the cross section of a composite of an electro conductive substrate and a fiber assembly after spinning of Example 5 of the present invention.
Figure 14:
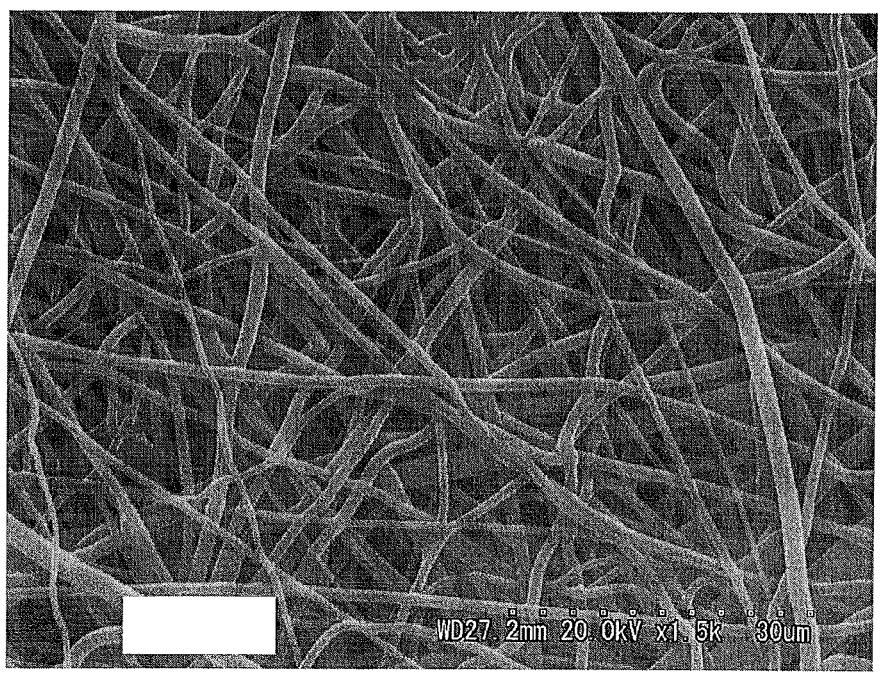
FIG. 14 is a scanning electron micrograph (SEM, magnified 1500 times) of the surface of a fiber assembly after heat treatment at 100° C. of Example 5 of the present invention.
Figure 15:
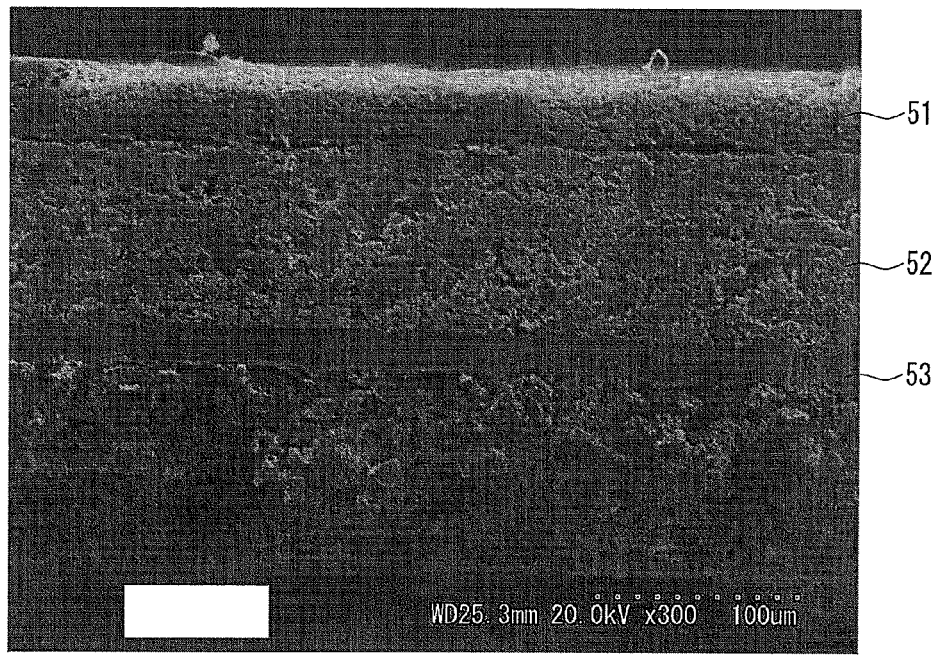
FIG. 15 is a scanning electron micrograph (SEM, magnified 300 times) of the cross section of a composite of art electro conductive substrate and a fiber assembly after heat treatment at 100° C. of Example 5 of the present invention.
Figure 16:
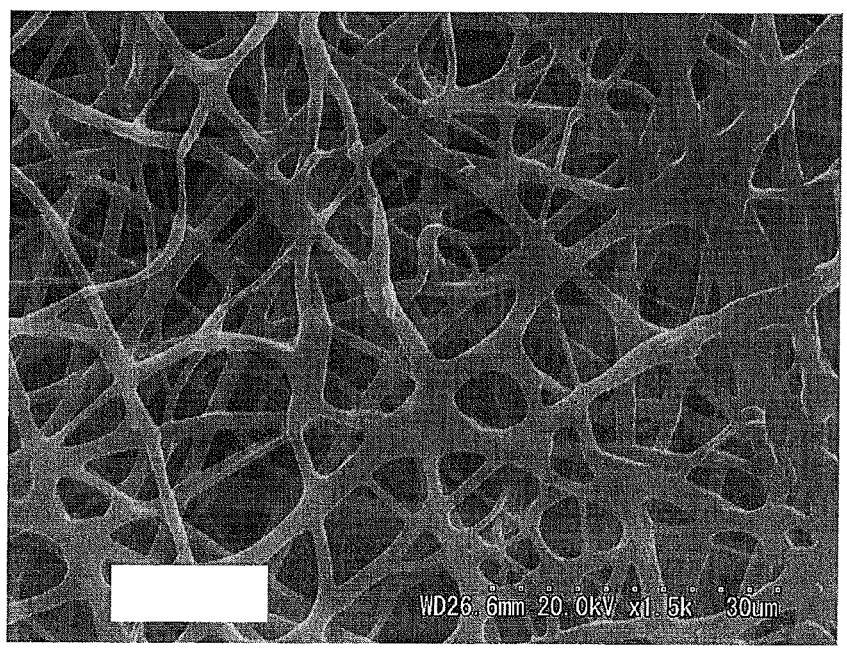
FIG. 16 is a scanning electron micrograph (SEM, magnified 1500 times) of the surface of a fiber assembly after heat treatment at 125° C. of Example 5 of the present invention.
Figure 17:
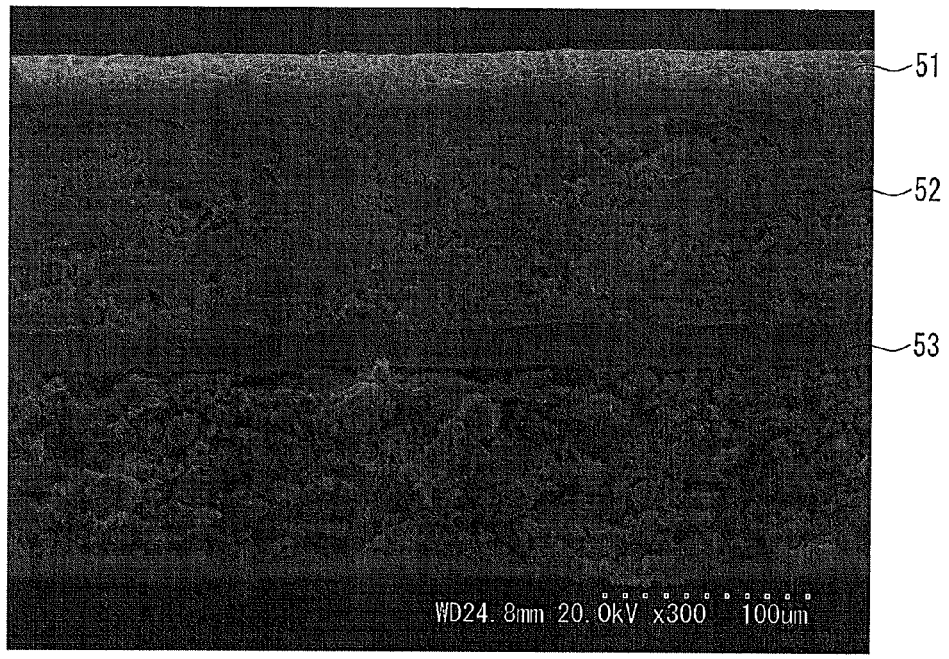
FIG. 17 is a scanning electron micrograph (SEM, magnified 300 times) of the cross section of a composite of an electro conductive substrate and a fiber assembly after heat treatment at 125° C. of Example 5 of the present invention.
Figure 18:
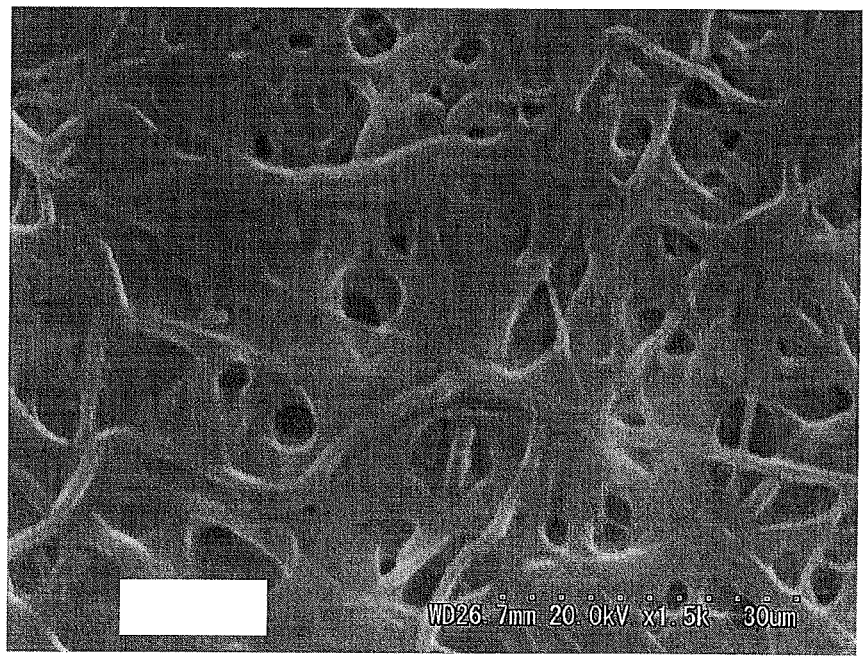
FIG. 18 is a scanning electron micrograph (SEM, magnified 1500 times) of the surface of a fiber assembly after heat treatment at 140° C. of Example 5 of the present invention.
Figure 19:
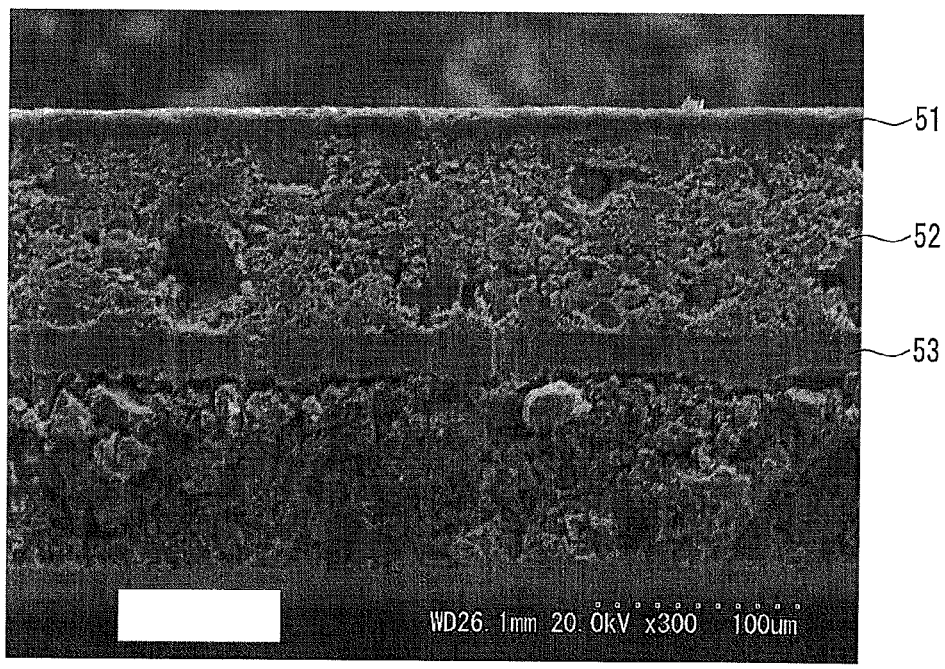
FIG. 19 is a scanning electron micrograph (SEM, magnified 300 times) of the cross section of a composite of an electro conductive substrate and a fiber assembly after heat treatment at 140° C. of Example 5 of the present invention.

A fiber assembly is obtained by accumulating an ultrafine composite fiber on the surface of an electro conductive substrate in the manner described above. The ultrafine composite fiber preferably is accumulated so as to be partially embedded in the surface of the electro conductive substrate. This is due to the fact that the charged state of the fiber is non-uniform and/or that the charged ultrafine composite fiber loses the charge to become uncharged at the moment that the ultrafine composite fiber arrives at the electro conductive substrate. Specifically, a state as shown in FIG. 13 is observed in which the ultrafine composite fibers have been bent in a V shape and embedded in the surface of the electro conductive substrate. The fiber assembly is covered and integrated with the electro conductive substrate at the same time when electrospinning is performed. In other words, in one step, it is possible to obtain a composite in which the surface of the electro conductive substrate has been directly covered with the fiber assembly and the electro conductive substrate and the fiber assembly have been integrated. As a result, the need to handle separately the ultrafine composite fiber that constitutes the fiber assembly can be eliminated, and thus excellent handling properties can be obtained. In the above-described composite, at least a part or all of the surface of the electro conductive substrate is covered and integrated with the fiber assembly. In the above-described composite, either one of the major surfaces of the electro conductive substrate may be covered and integrated with the fiber assembly or both of the major surfaces may be covered and integrated with the fiber assembly.

In the case where the fiber assembly is used as a battery separator, the need to perform a process of affixing an electrode plate and a separator can be eliminated, displacement and wrinkling will not occur in the separator, and thus good handling properties can be obtained. In this case, the electro conductive substrate may be either a positive electrode (plate) or a negative electrode (plate). The positive electrode includes, for example, an aluminum plate layer and active material layers provided on both sides of the aluminum plate layer, and the negative electrode includes a copper foil layer and active material layers provided on both sides of the copper foil layer. Furthermore, in the case where the fiber assembly is used as a battery separator, either one of the major surfaces of the positive electrode and/or the negative electrode may be covered and integrated with the fiber assembly, or both of the major surfaces may be covered and integrated with the fiber assembly. This enables easy production of a multilayered laminate containing an electrode and a battery separator.

In the composite of the present invention, it is preferable that the intersections between fibers in the fiber assembly are thermally bonded. Thermal bonding of the fiber assembly can be performed with, but is not particularly limited to, a heat treatment as described below.

The fiber assembly preferably is formed in a sheet form by softening the sea component and/or sheath component (second component) by a heat treatment, then hardening it to thermally bond the intersections between fibers. For example, a heat treatment at a temperature greater than or equal to the glass transition temperature of the second component and lower than or equal to the melting point thereof can cause thermal adhesion of the second component and provide a fiber assembly in which the intersections between the ultrafine composite fibers are thermally bonded. Examples of the heat treatment include, but are not particularly limited to, heat treatments such as an air-through dryer (hot air penetration method), a cylinder dryer (hot-plate press-bonding method), a heating/pressurization method using a heated roll, and the like. From the viewpoint of thermal shrinkage, in the heat treatment, it is preferable that the heating temperature is 70 to 180° C., and the heating time is 5 seconds to 30 minutes. In the case where the composite is a composite of an electrode and a battery separator in which the fiber assembly is used as the battery separator, the heat treatment is preferably performed by heating and pressurization with a linear pressure of 100 to 1000 kg/cm at a heating temperature of 60 to 120° C., using a pair of heated rolls. The ultrafine composite fiber contains at least two polymeric components, and preferably at least two polymeric components having different melting points: accordingly, excessive thermal shrinkage will not occur and the heat treatment facilitates bonding and integration.

The fiber assembly preferably has a mass per unit area of 0.5 to 200 g/m$^2$, and more preferably 1.0 to 150 g/m$^2$. If the mass per unit area is 0.5 g/m$^2$ or more, rupture of the web will not occur. If, on the other hand, the mass per unit area is 150 g/m$^2$ or less, the fiber collection can be carried out in a stable manner. In the case where the fiber assembly is used as a battery separator, if the mass per unit area is too small, the short circuit resistance and electrolyte retention properties tend to be low. If the mass per unit area is too large, it will be difficult to reduce the battery size. Accordingly, it is more preferable that the mass per unit area of the fiber assembly is 1 to 50 g/m$^2$. The mass per unit area as used herein refers to a mass per unit area measured according to JIS L 1906 5.2 (2006).

The fiber assembly preferably has a thickness of 1 to 300 μm, and more preferably 5 to 200 μm. If the thickness is 1 μm or more, rupture of the web will not occur. If, on the other hand, the thickness is 300 μm or less, the fiber collection can be carried out in a stable manner in the case where the fiber assembly is used as a battery separator, if the thickness is too small, the short circuit resistance and the electrolyte retention properties tend to be low, and if the thickness is too large, it will be difficult to reduce the battery size, and for this reason, it is more preferable that the thickness of the fiber assembly is preferably 10 to 150 μm. The thickness as used herein refers to a thickness measured according to JIS B 7502.

The fiber assembly preferably has a thermal shrinkage in a range of 125 to 140° C. of 3.0% or less, and more preferably 1.0% or less. If the thermal shrinkage is 3.0% or less, the fiber assembly will have good dimensional stability during heat treatment and is easy to handle. The thermal shrinkage as used herein refers to a thermal shrinkage measured according to JIS L 1906 5.9.1. Ordinary non-woven fabrics including hydroentangled non-woven fabrics and needle-punched non-woven fabrics are likely to undergo thermal shrinkage of approximately 6 to 10% when subjected to a heat treatment. The fiber assembly of the present invention, however, has a smaller thermal shrinkage than ordinary non-woven fabrics, and thus excellent handling properties can be obtained. Therefore, in the case where the fiber assembly is used as a battery separator, the fiber assembly safely can reduce the pore size between fibers with less thermal shrinkage in a temperature range of around 125° C. to 140° C. in which the shut-down function is required.

The fiber assembly before heat treatment preferably has a tensile strength of 2 N/25 mm or more, and more preferably 3 N/25 mm or more. If the tensile strength before heat treatment is 2 N/25 mm or more, rupture will not occur, and thus excellent handling properties can be obtained. The fiber assembly after heat treatment preferably has a tensile strength of 3 N/25 mm or more, and more preferably 5 N/25 mm or more. Tithe tensile strength after heat treatment is 3 N/25 mm or more, rupture will not occur, and thus excellent handling properties can be obtained. The tensile strength of the fiber assembly as used herein refers to a tensile strength measured according to JIS L 1096 8.12.1 (strip method) (2006).

The fiber assembly preferably has a peel strength of 0.1 N or more, and more preferably 0.15 N or more. If the peel strength is 0.1 N or more, excellent integration with the electro conductive substrate can be achieved, displacement and wrinkling are unlikely to occur. The peel strength of the fiber assembly as used herein refers to a peel strength between the electro conductive substrate and the fiber assembly of the composite. Specifically, a test piece having a width of 25 mm and a length of 100 mm is cut out of the composite, the fiber assembly is peeled 75 mm from one end of the electro conductive substrate in the lengthwise direction, and thereafter the test piece is set in a tensile tester, with one clamp holding the fiber assembly over a width of 25 mm. The test piece is pulled at a pulling speed of 30 cm/min from a clamp interval of 100 mm to 130 mm, and thereby a stress-strain curve was obtained. Next, in the obtained stress-strain curve, three highest and three lowest tensile strengths are selected, and the six tensile strengths are averaged and defined as the peel strength.

The fiber assembly preferably has a puncture strength of 50 gf or more, and more preferably 100 gf or more. If the puncture strength is 50 gf or more, the fiber assembly can be used suitably in fields that require puncture strength, for example, as a battery separator, a covering material or the like. As used herein, the puncture strength of the fiber assembly refers to a measured load (gf) at which defects such as holes are formed in a fiber assembly by setting the fiber assembly to a fixed frame having a diameter of 25 mm and penetrating it with a puncture needle having a tip radius of 1 mm at a speed of 100 mm/min.

The fiber assembly preferably has an air permeability of 0.1 to 20 s/100 cc, and more preferably 0.2 to 15 s/100 cc. If the air permeability is within the range of 0.1 to 20 s/100 cc, the fiber assembly can be suitably used in fields that require air permeability, for example, as a filter or the like. In the case where the fiber assembly is used as a battery separator, if the air permeability is within the above range, the chemical reaction within the battery can be maintained in good condition. The air permeability of the fiber assembly as used herein refers to an air permeability measured according to JIS P 8117.

In the fiber assembly, the ultrafine composite fiber maintains the fibrous form and micropores are formed between portions of the ultrafine composite fiber. The micropores preferably have an average pore size of 0.3 to 10 µm, more preferably 0.5 to 5 µm, and even more preferably 0.8 to 3 µm. If the average pore size is 10 µm or less, the fiber assembly can be suitably used as a filter or a battery separator. The micropores preferably have a maximum pore size of 15 µm or less, and more preferably 10 µm or less. If the average pore size is too small, ions cannot migrate smoothly when the fiber assembly is used as, for example, a battery separator. If the average pore size is too large, ions will migrate excessively, and thus a too large average pore size is not appropriate. The average pore size (mean flow pore diameter) and the maximum pore size (bubble point pore diameter) as used herein refer to an average pore size and a maximum pore size measured by a bubble point method according to ASTM F 316 86.

As described, above, in the composite of the present invention, the fiber assembly, in particular, the heat-treated fiber assembly has a high tensile strength, peel strength and puncture strength. In the heat-treated fiber assembly, the ultrafine composite fiber maintains the fibrous form. Furthermore, the heat-treated fiber assembly undergoes less thermal shrinkage. Accordingly, the composite of the present invention is very useful as a battery separator in, for example, a lithium ion battery or the like. The composite of the present invention also can be used as a filter, a sound absorbing material or a covering material.

For example, in the production process of batteries such as lithium ion batteries, because a positive electrode, a separator such as a PE microporous membrane and a negative electrode are wound simultaneously, the PE microporous membrane is required to have strength, and there is a problem in productivity However, in the case where the present invention is used as a composite of an electrode and a battery separator, the composite of the present invention exhibits a high strength because the fiber assembly is integrated with the positive electrode and/or the negative electrode, and thus the productivity can be improved.

Figure 5:
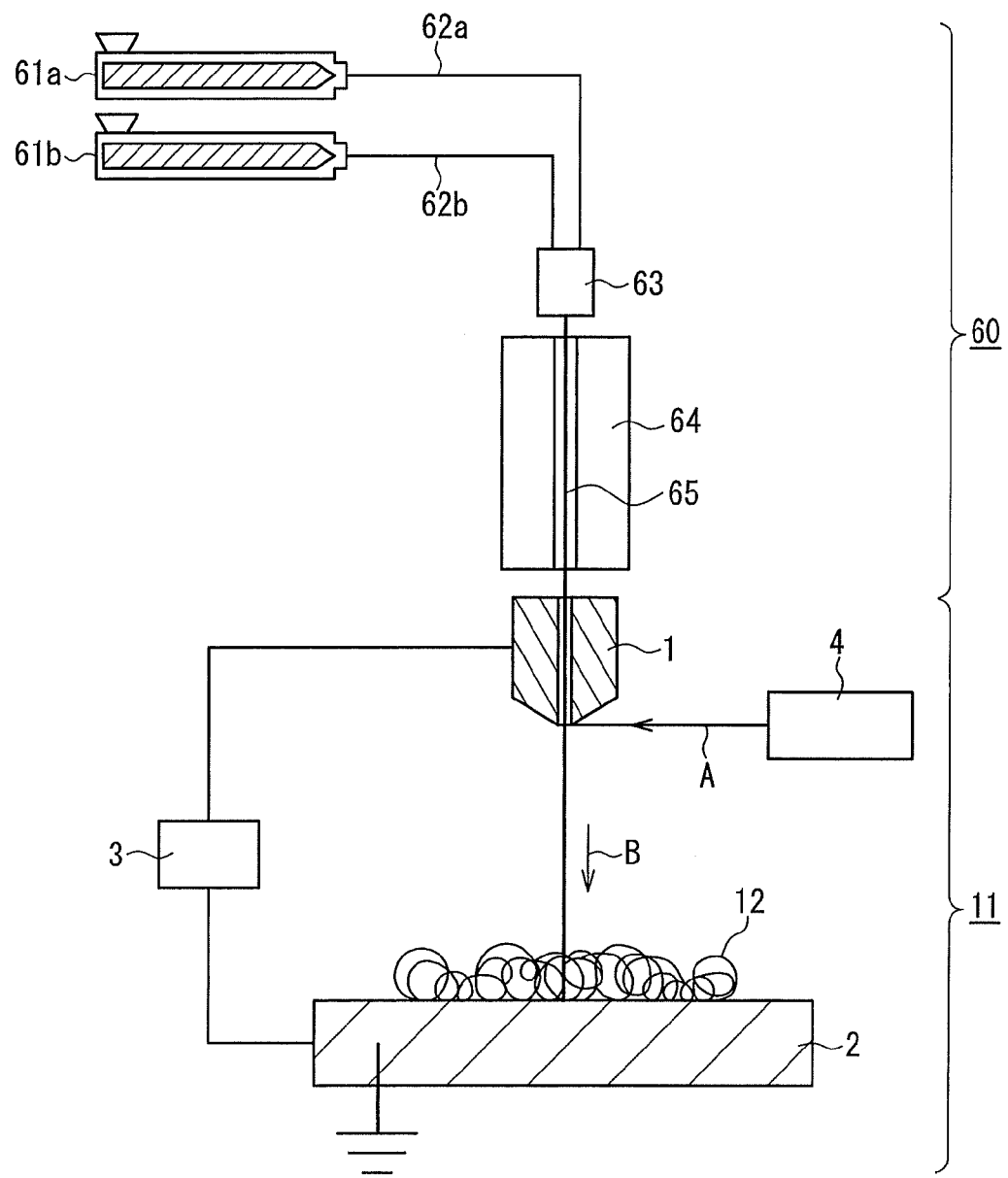
FIG. 5 is an illustrative schematic diagram of an electrospinning apparatus according to another embodiment of the present invention.

FIG. 5 is an illustrative schematic diagram of an electrospinning apparatus according to another embodiment of the present invention, showing an example in which a melt-spinning apparatus 60 is connected in advance of the supply-side electrode 1 of the electrospinning apparatus 11 shown in FIG. 1 or 3. The melt-spinning apparatus 60 supplies melted polymers as a first component and a second component to melted-polymer feed lines 62a and 62b from extruders 61a and 61b, extrudes a melted composite fiber 65 from a composite spinning machine 63, and supplies it to the supply-side electrode 1 through a heating or temperature retaining region 64. The process after this is the same as that described in FIG. 1 or 3.

EXAMPLES

Hereinafter, the present invention will be described in further detail by way of examples. It should be noted that the present invention is not limited to the following examples.

The following measurement methods were used in examples and comparative examples.

Method for Measuring Fiber Diameter

A fiber side face was inspected visually using a scanning electron microscope (SEM, S-3500N (trade name) manufactured by Hitachi, Ltd., magnification: 1500 times), and an average value was determined from the measurement results of randomly selected 30 monofilaments.

Mass Per Unit Area

Mass per unit area was measured according to JIS L 1906 (2000).

Thermal Shrinkage

In accordance with JIS L 1906 5.9.1, the temperature within the apparatus was set to 100° C., and thermal shrinkage in the lengthwise direction of the composite fiber was determined using a non-woven fabric test piece having a width of 20 cm and a length of 20 cm.

Tensile Strength

In accordance with JIS L 1096 6.12.1 (strip method), tensile strength in the lengthwise direction of the composite fiber was measured using a non-woven fabric test piece having a width of 5 cm and a length of 15 cm.

Puncture Strength

A non-woven fabric was set in a 25 mmϕ fixed frame, and then penetrated with a puncture needle having a tip radius of 1 mmϕ at a speed of 100 mm/min. A load (OD at which defects such as holes were formed in the non-woven fabric was determined and defined as the puncture strength. Note that 1 gf equals to $9.8 \times 10^{-3}$ N.

Average Pore Size and Maximum Pore Size

Average pore size and maximum pore size were measured by a bubble point method according to ASTM F 316 86.

Collection Efficiency

A measurement method according to JIS B 9908 was used in which measurement was performed by mounting a non-woven fabric test piece instead of a filter unit and filtrating air dust at a measurement speed of 5.3 cm/sec with a filter area of 100 mmϕ. Particles of 0.3 to 2.0 μm were fractioned before and after filtration, the number of particles was counted, and collection efficiency was calculated using the following equation. Here, the results of three samples were averaged.

Collection efficiency (%)=(1−C2/C1)×100, where C1 is the number of particles before filtration, and C2 is the number of particles after filtration.

Pressure Loss

The upstream pressure and the downstream pressure of the non-woven fabric test piece mounted instead of a filter unit in the above collection efficiency measurement were measured, and the difference between the upstream pressure and the downstream pressure was defined as the pressure loss.

Air Permeability

Air permeability was measured according to JIS P 8117. B type Gurley densometer (manufactured by Toyo Seiki Seisaku-sho, Ltd.) was used as the measuring apparatus. A non-woven fabric test piece was securely attached over a circular hole having a diameter of 28.6 mm and an area of 645 mm$^2$. The air in the cylinder was forced out of the cylinder through the test circular hole portion using an inner cylinder weight of 567 g. The time required for 100 cc of air to pass through the test piece was measured and defined as the air permeability (Gurley value).

Source Resin

The following materials were used.

(1) Polypropylene (PP): SA03 manufactured by Japan. Polypropylene Corporation, melting point: 161° C., melt flow rate measured according to JIS-K-7210 (MFR, measurement temperature: 230° C., load: 21.18 N (2.16 kgf)): 30 g/10 min (2) High density polyethylene (PE): HE4.81 manufactured by Japan Polyethylene Corporation, melting point: 130° C., melt flow rate measured according to JIS-K-7210 (MFR, measurement temperature: 190° C., load: 21.18 N (2.16 kgf)): 12 g/10 min (3) Ethylene-vinyl alcohol copolymer (EVOH): K3835BN manufactured by Nippon Synthetic Chemical Industry Co., Ltd., melting point: 171° C., melt flow rate measured according to JIS-K-7210 (MFR, measurement temperature: 230° C., load: 21.18 N (2.16 40): 35 g/10 min (4) Ethylene-propylene copolymer (EP): WXK1183 manufactured by Japan Polypropylene Corporation, melting point: 128° C., melt flow rate measured according to JIS-K-7210 (MFR, measurement temperature: 230° C., load: 21.18 N (2.16 kgf)): 25 g/10

(5) Polyethylene terephthalate (PET): T200E manufactured by Thray Industries, Inc., melting point: 255° C.

(6) Polyvinyl alcohol (PVA): an aqueous solution containing 10 mass % of JP-18S manufactured by Japan VAM & POVAL Co., Ltd.

Production of Composite-Resin-Formed Product

As for the composite-resin-formed product, melt-spinning was performed according to a conventional method to obtain an undrawn yarn, and the yarn was used as the source composite-resin-formed product (source composite fiber).

Electrospinning Method

The apparatus shown in FIG. 1 was used as an electrospinning apparatus under the following conditions.

Voltage between electrodes: 32.5 kV
Distance between electrodes: 10 cm
Spinning speed: 30 mm/min
Ambient temperature: 23° C.
Laser apparatus: PENT-30R manufactured by Onizuka Glass Co., Ltd. (rated output: 30 W, wavelength: 10.6 μm, beam diameter: 6 mm)
Distance between supply-side electrode and laser irradiation section: 4 mm
Supply-side electrode: UN series 20G×15, as a single unit, manufactured by Unicontrols Co., Ltd., laser intensity: 20 mA Production Examples 1 to 8

Table 1 below shows the island components or core components (first components) and the sea components or sheath components (second components) of source composite fibers used to produce ultrafine composite fibers of Production Examples 1 to 8, the proportion between the first component and the second component, the cross-sectional structure, the fiber diameter of a single monofilament, the total number of fibers, and the spinning flow rate. Ultrafine composite fibers of Production Examples 1 to 8 were obtained using the source composite fibers shown in Table 1 under the above-described spinning conditions. Note that the ultrafine composite fibers of Production Examples 1 to 5 had a cross section similar to the fiber cross sections of the source composite fibers. Table 1 also shows the fiber diameter of the ultrafine composite fibers of Production Examples 1 to 8 after spinning.

TABLE 1

| Production Example | Source composite fiber (or source resin) | | | | | | | Fiber diameter of monofilament after spinning (μm) |
|---|---|---|---|---|---|---|---|---|
| | Island (core) component | Sea (sheath) component | Cross-sectional structure | Proportion (mass %) | Spinning flow rate (g/min) | Fiber diameter of monofilament (μm) | Number of fibers (fibers) | |
| 1 | EVOH | EP | Sea-island, 37 island fibers | 50/50 | 0.0067 | 22 | 181 | 0.89 |
| 2 | EVOH | PE | Sea-island, 37 island fibers | 50/50 | 0.0067 | 22 | 181 | 0.91 |
| 3 | EVOH | PE | Core-sheath | 50/50 | 0.0067 | 25 | 600 | 2.84 |
| 4 | PET | PE | Sea-island, 37 island fibers | 50/50 | 0.0071 | 35 | 181 | 7.65 |

TABLE 1-continued

| | Source composite fiber (or source resin) | | | | | | | Fiber diameter |
|---|---|---|---|---|---|---|---|---|
| Production Example | Island (core) component | Sea (sheath) component | Cross-sectional structure | Proportion (mass %) | Spinning flow rate (g/min) | Fiber diameter of monofilament (μm) | Number of fibers (fibers) | of monofilament after spinning (μm) |
| 5 | PP | EVOH | Sea-island, 37 island fibers | 50/50 | 0.0067 | 22 | 181 | 1.34 |
| 6 | PP | PE | Core-sheath | 50/50 | 0.0067 | 18 | 600 | Spinning not possible |
| 7 | PP | EP | Core-sheath | 50/50 | 0.0067 | 18 | 600 | Spinning not possible |
| 8 | PVA | 10% PVA solution was used | | | 0.0051 | — | — | 0.22 |

As is clear from Table 1, in Production Examples 1 to 4, good spinning properties and ultrafine composite fibers were obtained because the island component or core component of the source composite fiber as the composite-resin-formed product had a volume specific resistance of $10^{15}$ Ω·cm or less. Good spinning properties and an ultrafine fiber were also obtained in Production Example 5, in which a composite-resin-formed product containing a sea component having a volume specific resistance of $10^{15}$ Ω·cm or less was used. On the other hand, in Production Examples 6 and 7, spinning was not possible because these examples employed a composite-resin-formed product made of 100% of polymeric components having a volume specific resistance exceeding $10^{15}$ Ω·cm without a polymeric component having a volume specific resistance of $10^{15}$ Ω·cm or less. In Production Example 8, in which a liquid source resin was used, an ultrafine fiber was obtained by a solution electrospinning method.

Figure 8:
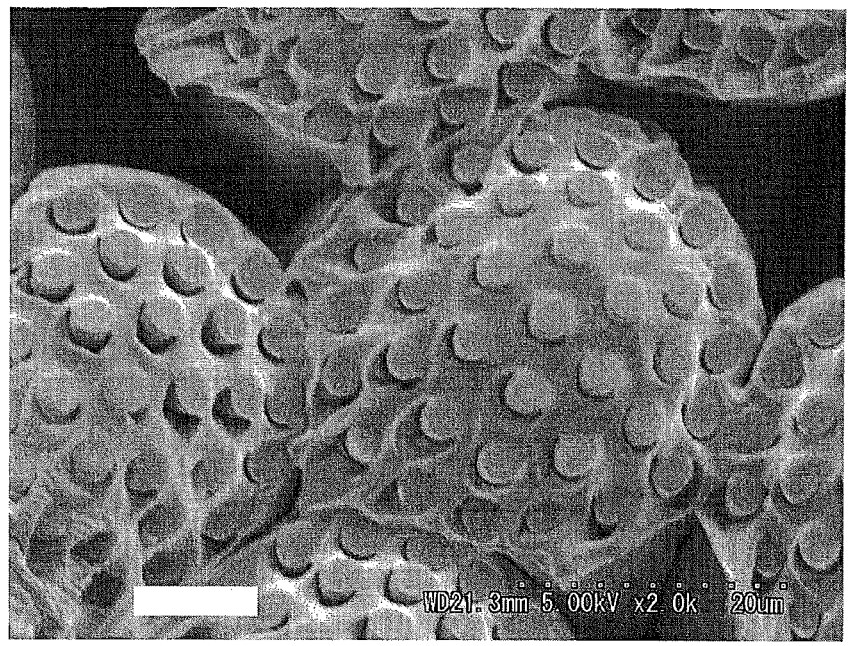
FIG. 8 is a scanning electron micrograph (SEM, magnified 2000 times) of the cross section of a source composite fiber used in Production Example 1 of the present invention before spinning.

A scanning electron micrograph (SEM, magnified 2000 times) of the cross section of the source composite fiber used in Production Example 1 before spinning is shown in FIG. 8.

Example 1

First, the ultrafine composite fiber of Production Example 1 was accumulated to obtain a fiber assembly (hereinafter referred to as a "spun non-woven fabric"). Next, the fiber assembly was heat-treated by a method using an air-through dryer at 145° C. for 30 seconds to produce a thermally-bonded non-woven fabric (hereinafter referred to as an "air-through dried non-woven fabric"), or was heat-treated by a method using a cylinder dryer at 140° C. for 30 seconds to produce a thermally-bonded non-woven fabric (hereinafter referred to as a "cylinder-dried non-woven fabric").

Figure 9:
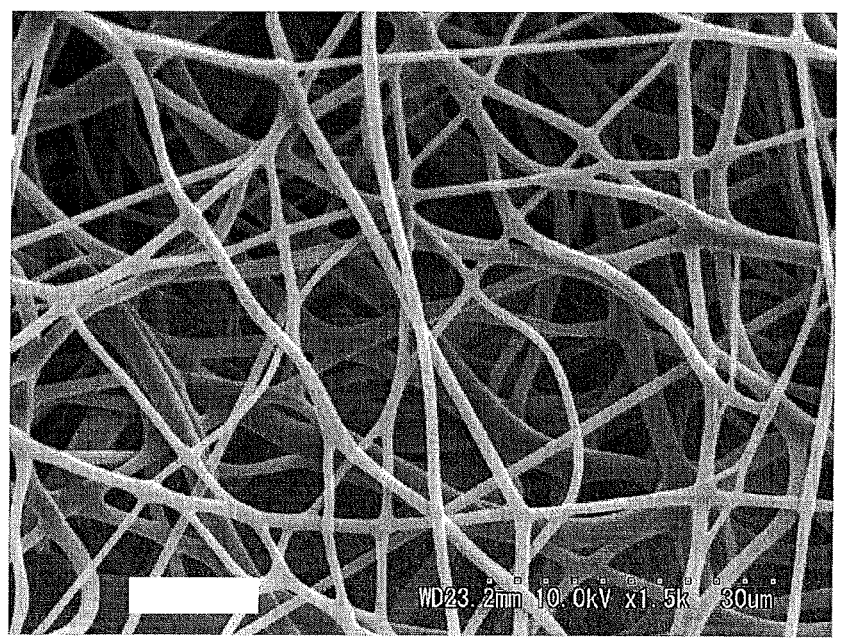
FIG. 9 is a scanning electron micrograph (SEM, magnified 1500 times) of the surface of a spun non-woven fabric of Example 1 of the present invention.
Figure 10:
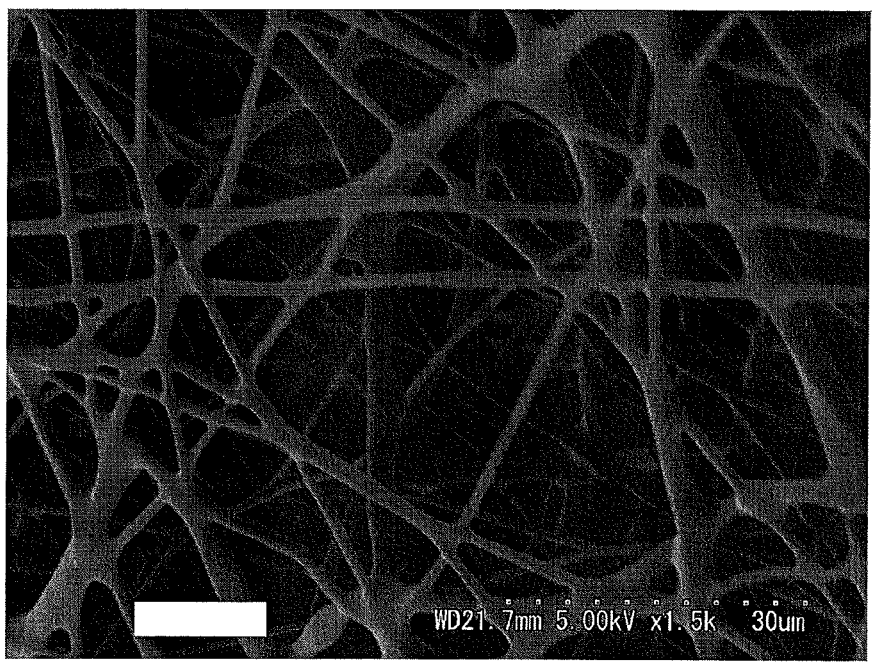
FIG. 10 is a scanning electron micrograph (SEM, magnified 1500 times) of the surface of an air-through dried non-woven fabric of Example 1 of the present invention.
Figure 11:
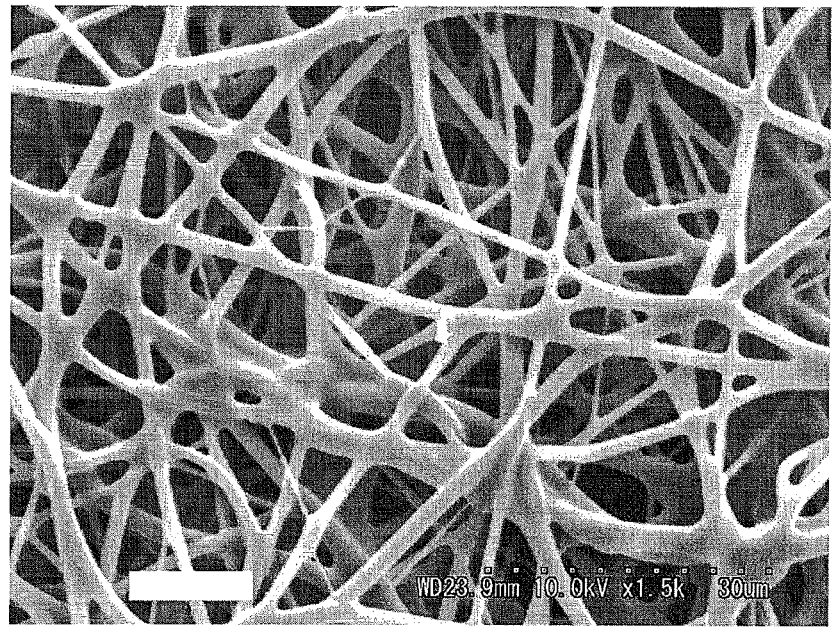
FIG. 11 is a scanning electron micrograph (SEM, magnified 1500 times) of the surface of a cylinder-dried non-woven fabric of Example 1 of the present invention.
Figure 12:
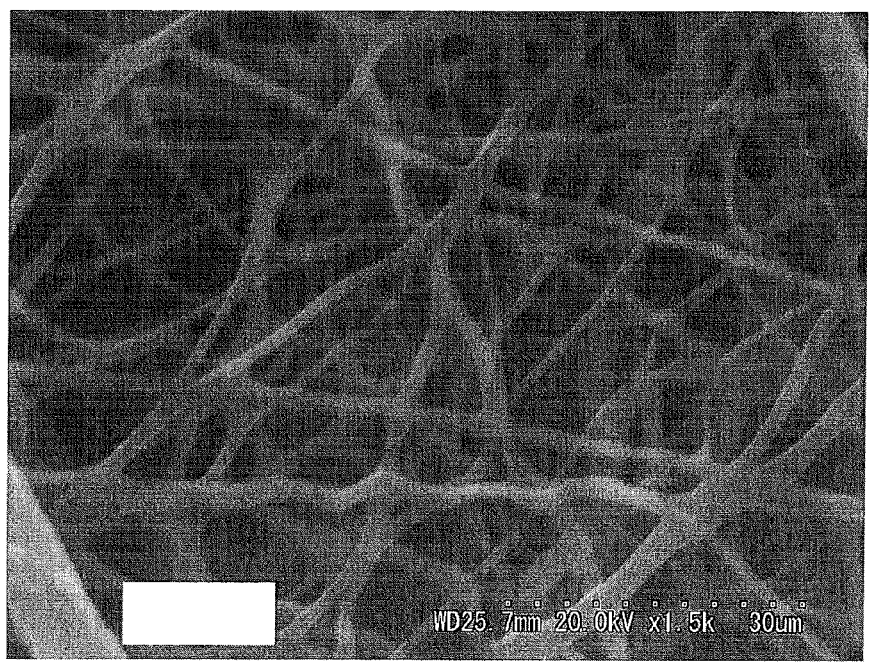
FIG. 12 is a scanning electron micrograph (SEM, magnified 1500 times) of the surface of a fiber assembly after spinning of Example 5 of the present invention.

Scanning electron micrographs (SEM, magnified 1500 times) of the surface of the spun non-woven fabric, the air-through dried non-woven fabric and the cylinder-dried non-woven fabric obtained in the manner described above are shown in FIGS. 9, 10 and 11, respectively.

Examples 2 to 4

Non-woven fabrics of Examples 2 to 4 were produced in the same manner as in Example 1, using the ultrafine composite fibers of Production Examples 2 to 4.

Comparative Examples 1 and 2

Non-woven fabrics of Comparative Examples 1 and 2 were produced in the same manner as in Example 1, using the ultrafine composite fiber of Production Example 5 and the ultrafine fiber of Production Example 8, respectively.

The non-woven fabrics of Examples 1 to 4 and Comparative Examples 1 and 2 were subjected to measurements described above for their material characteristics such as mass per unit area, thickness, thermal shrinkage, tensile strength, puncture strength, air permeability average pore size, maximum pore size, pressure loss, and collection efficiency and the measurement results are shown in Tables 2 to 4.

TABLE 2

| | | | Material characteristics | | | | | | |
|---|---|---|---|---|---|---|---|---|---|
| | | Non-woven fabric | Mass per unit area (g/m²) | Thickness (μm) | Thermal shrinkage (%) | Tensile strength (N/5 cm) | Puncture strength (gf) | Air permeability (s/100 cc) | Average pore size (μm) |
| Ex. 1 | After spinning | | 20 | 33 | — | 27.53 | 384 | 5.4 | 0.98 |
| | | | 12 | 19 | — | 22.34 | 156 | 0.6 | 2.32 |
| | | | 9 | 15 | — | 15.64 | 123 | 0.1 | 5.43 |
| | | | 6 | 10 | — | 14.21 | 101 | 0.1 | 6.78 |
| | Air-through dried | | 20 | 32 | 1.1 | 100.98 | 456 | 8.9 | 0.54 |
| | | | 12 | 17 | 1.3 | 89.01 | 203 | 1.1 | 1.02 |
| | | | 9 | 13 | 2.4 | 62.49 | 165 | 0.2 | 1.54 |
| | | | 6 | 9 | 2.5 | 55.18 | 154 | 0.1 | 2.22 |
| | Cylinder-dried | | 20 | 31 | 0.9 | 121.23 | 498 | 12.8 | 0.31 |
| | | | 12 | 16 | 0.8 | 95.67 | 245 | 5.4 | 0.89 |
| | | | 9 | 13 | 1.5 | 70.09 | 188 | 3.2 | 1.21 |
| | | | 6 | 9 | 1.3 | 28.71 | 175 | 0.9 | 1.99 |
| Ex. 2 | After spinning | | 20 | 31 | — | 32.12 | 422 | 4.3 | 1.21 |
| | | | 12 | 18 | — | 23.43 | 190 | 0.5 | 3.45 |
| | | | 9 | 14 | — | 18.91 | 134 | 0.1 | 4.56 |
| | | | 6 | 10 | — | 15.43 | 100 | 0.1 | 6.21 |
| | Air-through dried | | 20 | 32 | 0.9 | 112.12 | 432 | 7.9 | 0.99 |
| | | | 12 | 18 | 1.1 | 95.67 | 190 | 1.3 | 1.05 |
| | | | 9 | 14 | 1.9 | 76.54 | 170 | 0.1 | 1.65 |
| | | | 6 | 10 | 2.2 | 52.11 | 143 | 0.1 | 2.45 |

TABLE 2-continued

| Non-woven fabric | Mass per unit area (g/m²) | Thickness (μm) | Thermal shrinkage (%) | Tensile strength (N/5 cm) | Puncture strength (gf) | Air permeability (s/100 cc) | Average pore size (μm) |
|---|---|---|---|---|---|---|---|
| Cylinder-dried | 20 | 29 | 0.8 | 130.8 | 455 | 10.9 | 0.54 |
|  | 12 | 16 | 0.8 | 98.76 | 286 | 6.7 | 0.71 |
|  | 9 | 12 | 1.3 | 69.09 | 190 | 3.5 | 0.98 |
|  | 6 | 9 | 1.4 | 42.1 | 132 | 0.6 | 1.43 |

| | Non-woven fabric | Material characteristics | | | | | |
|---|---|---|---|---|---|---|---|
| | | Maximum pore size (μm) | Pressure loss (Pa) | Collection efficiency (%) | | | |
| | | | | 0.3 μm | 0.5 μm | 1.0 μm | 2.0 μm |
| Ex. 1 | After spinning | 9.87 | 45.7 | 95.65 | 97.86 | 99.22 | 99.87 |
| | | 13.41 | 32.2 | 75.43 | 88.98 | 95.67 | 96.89 |
| | | 15.67 | 28.8 | 67.54 | 84.65 | 90.12 | 94.25 |
| | | 18.79 | 21.3 | 29.01 | 49.34 | 62.31 | 70.91 |
| | Air-through dried | 3.45 | 90.8 | 96.32 | 98.90 | 99.45 | 100.00 |
| | | 5.43 | 44.7 | 78.29 | 91.25 | 96.48 | 97.26 |
| | | 5.78 | 47.5 | 73.54 | 85.61 | 93.43 | 92.95 |
| | | 8.91 | 18.3 | 36.71 | 59.57 | 72.24 | 86.08 |
| | Cylinder-dried | 1.56 | 130.4 | 98.76 | 99.10 | 99.65 | 99.99 |
| | | 4.54 | 89.2 | 86.71 | 93.42 | 97.87 | 98.91 |
| | | 4.21 | 67.7 | 79.80 | 86.32 | 94.32 | 97.65 |
| | | 6.75 | 33.4 | 65.43 | 76.34 | 94.44 | 96.54 |
| Ex. 2 | After spinning | 10.98 | 40.1 | 96.54 | 97.90 | 99.22 | 99.91 |
| | | 14.32 | 33.3 | 77.62 | 87.75 | 97.65 | 97.65 |
| | | 14.98 | 31.2 | 69.01 | 83.21 | 90.78 | 98.71 |
| | | 18.65 | 19.7 | 31.21 | 39.01 | 67.98 | 80.90 |
| | Air-through dried | 5.43 | 87.5 | 97.87 | 98.99 | 99.65 | 99.91 |
| | | 4.34 | 40.9 | 80.21 | 93.45 | 97.87 | 98.71 |
| | | 6.76 | 54.1 | 75.64 | 88.91 | 94.54 | 95.43 |
| | | 7.98 | 22.3 | 44.32 | 50.98 | 75.64 | 93.21 |
| | Cylinder-dried | 2.12 | 90.9 | 97.97 | 99.10 | 99.70 | 99.99 |
| | | 3.98 | 79.8 | 88.88 | 94.50 | 98.01 | 99.11 |
| | | 4.55 | 70.1 | 81.02 | 88.90 | 94.98 | 99.21 |
| | | 6.56 | 56.7 | 70.98 | 81.01 | 96.50 | 98.72 |

TABLE 3

| | Non-woven fabric | Material characteristics | | | | | | |
|---|---|---|---|---|---|---|---|---|
| | | Mass per unit area (g/m²) | Thickness (μm) | Thermal shrinkage (%) | Tensile strength (N/5 cm) | Puncture strength (gf) | Air permeability (s/100 cc) | Average pore size (μm) |
| Ex. 3 | After spinning | 20 | 42 | — | 22.31 | 350 | 5.6 | 1.12 |
| | | 12 | 25 | — | 20.98 | 203 | 0.8 | 3.21 |
| | | 9 | 21 | — | 14.32 | 156 | 0.1 | 5.98 |
| | | 6 | 13 | — | 12.33 | 111 | 0.1 | 7.91 |
| | Air-through dried | 20 | 35 | 4.2 | 42.5 | 425 | 7.6 | 0.87 |
| | | 12 | 20 | 5.9 | 44.3 | 302 | 1.1 | 1.34 |
| | | 9 | 15 | 8.2 | 31.11 | 201 | 0.2 | 1.89 |
| | | 6 | 11 | 9.1 | 19.32 | 190 | 0.2 | 2.45 |
| | Cylinder-dried | 20 | 34 | 4.4 | 72.3 | 450 | 10.5 | 0.52 |
| | | 12 | 18 | 5.1 | 51.5 | 345 | 0.9 | 0.98 |
| | | 9 | 15 | 7.6 | 47.6 | 255 | 0.2 | 1.45 |
| | | 6 | 11 | 8.7 | 39.8 | 210 | 0.2 | 2.21 |
| Ex. 4 | After spinning | 20 | 64 | — | 22.12 | 100 | 0.1 | 10.98 |
| | | 12 | 54 | — | 23.42 | 99 | 0.1 | 19.08 |
| | | 9 | 36 | — | 19.8 | 80 | 0.1 | 28.76 |
| | | 6 | 23 | — | 10.21 | 50 | 0.1 | 54.67 |
| | Air-through dried | 20 | 60 | 8.9 | 32.5 | 121 | 0.1 | 9.87 |
| | | 12 | 45 | 9.1 | 33.33 | 120 | 0.1 | 17.89 |
| | | 9 | 33 | 12.3 | 25.43 | 101 | 0.1 | 22.12 |
| | | 6 | 22 | 14.5 | 15.67 | 67 | 0.1 | 50.01 |
| | Cylinder-dried | 20 | 48 | 15.4 | 43.5 | 145 | 0.2 | 8.91 |
| | | 12 | 30 | 14.5 | 38.91 | 133 | 0.1 | 16.75 |
| | | 9 | 27 | 13.1 | 25.67 | 112 | 0.1 | 19.75 |
| | | 6 | 19 | 13.1 | 20.98 | 120 | 0.1 | 44.43 |

TABLE 3-continued

| | Non-woven fabric | Material characteristics | | | | | |
|---|---|---|---|---|---|---|---|
| | | Maximum pore size (μm) | Pressure loss (Pa) | Collection efficiency (%) | | | |
| | | | | 0.3 μm | 0.5 μm | 1.0 μm | 2.0 μm |
| Ex. 3 | After spinning | 10.98 | 45.6 | 96.75 | 98.21 | 99.01 | 99.43 |
| | | 14.35 | 39.8 | 65.43 | 89.01 | 92.43 | 94.54 |
| | | 18.09 | 30.1 | 56.78 | 78.96 | 85.76 | 90.80 |
| | | 21.34 | 28.7 | 25.67 | 34.56 | 47.91 | 69.87 |
| | Air-through dried | 6.54 | 109.8 | 97.65 | 97.21 | 98.09 | 99.03 |
| | | 6.66 | 65.4 | 70.98 | 83.42 | 93.45 | 93.98 |
| | | 10.98 | 56.7 | 71.54 | 80.98 | 89.09 | 90.00 |
| | | 11.23 | 23.5 | 54.34 | 55.67 | 65.64 | 83.21 |
| | Cylinder-dried | 4.53 | 167.6 | 97.89 | 98.76 | 99.10 | 99.44 |
| | | 5.67 | 78.9 | 90.89 | 92.34 | 98.76 | 99.09 |
| | | 9.98 | 70.3 | 80.91 | 83.56 | 92.32 | 94.32 |
| | | 10.01 | 54.1 | 56.71 | 69.08 | 92.34 | 95.64 |
| Ex. 4 | After spinning | 88.92 | 21.34 | 5.67 | 6.66 | 43.21 | 67.89 |
| | | 170.98 | 22.34 | — | 6.78 | 33.34 | 23.45 |
| | | 355.21 | 19.87 | — | — | 21.22 | 20.00 |
| | | 672.34 | 6.75 | — | — | 20.01 | 13.42 |
| | Air-through dried | 33.42 | 43.21 | 10.97 | 11.22 | 34.56 | 22.34 |
| | | 99.88 | 28.97 | — | — | — | — |
| | | 56.74 | 25.67 | — | — | — | — |
| | | 72.43 | 10.98 | — | — | — | — |
| | Cylinder-dried | 89.09 | 65.43 | 43.54 | 33.86 | 55.65 | 58.97 |
| | | 78.9 | 33.43 | 22.34 | 25.67 | 40.98 | 54.21 |
| | | 101.5 | 42.34 | 12.32 | 11.31 | 15.67 | 23.45 |
| | | 120.9 | 18.99 | — | — | — | — |

TABLE 4

| | Non-woven fabric | Material characteristics | | | | | | |
|---|---|---|---|---|---|---|---|---|
| | | Mass per unit area (g/m²) | Thickness (μm) | Thermal shrinkage (%) | Tensile strength (N/5 cm) | Puncture strength (gf) | Air permeability (s/100 cc) | Average pore size (μm) |
| Comp. Ex. 1 | After spinning | 20 | 37 | — | 27.89 | 366 | 5.2 | 1.34 |
| | | 12 | 23 | — | 27.01 | 163 | 0.7 | 2.43 |
| | | 9 | 19 | — | 14.56 | 145 | 0.1 | 4.98 |
| | | 6 | 15 | — | 12.34 | 120 | 0.1 | 5.98 |
| | 145° C. air-through dried | 20 | 37 | 0.1 | 32.43 | 370 | 5.4 | 1.42 |
| | | 12 | 22 | 0.1 | 29.08 | 170 | 0.8 | 2.98 |
| | | 9 | 19 | 0.1 | 25.65 | 150 | 0.2 | 3.99 |
| | | 6 | 15 | 0.1 | 24.98 | 120 | 0.2 | 6.42 |
| | 140° C. Cylinder-Dried | 20 | 34 | 0.1 | 44.56 | 354 | 5.6 | 1.83 |
| | | 12 | 20 | 0.1 | 41.23 | 143 | 1.1 | 2.22 |
| | | 9 | 18 | 0.1 | 35.65 | 150 | 0.5 | 3.45 |
| | | 6 | 14 | 0.1 | 34.21 | 109 | 0.5 | 5.77 |
| Comp. Ex. 2 | After spinning | 6 | 8 | — | — | 34 | 13.2 | 0.22 |
| | 145° C. air-through dried | 6 | — | — | — | — | — | — |
| | 140° C. Cylinder-Dried | 6 | — | — | — | — | — | — |

| | Non-woven fabric | Material characteristics | | | | | |
|---|---|---|---|---|---|---|---|
| | | Maximum pore size (μm) | Pressure loss (Pa) | Collection efficiency (%) | | | |
| | | | | 0.3 μm | 0.5 μm | 1.0 μm | 2.0 μm |
| Comp. Ex. 1 | After spinning | 8.97 | 43.2 | 94.55 | 96.50 | 98.71 | 99.10 |
| | | 11.2 | 33.4 | 77.89 | 87.42 | 94.50 | 95.67 |
| | | 13.41 | 30.2 | 68.43 | 83.11 | 89.01 | 93.24 |
| | | 15.69 | 25.6 | 45.67 | 48.76 | 70.12 | 76.59 |
| | 145° C. air-through dried | 9.03 | 45.6 | 94.67 | 95.91 | 97.81 | 99.34 |
| | | 10.91 | 36.5 | 78.91 | 88.12 | 93.21 | 96.75 |
| | | 12.99 | 41.1 | 62.32 | 80.12 | 91.22 | 93.42 |
| | | 14.59 | 30.2 | 39.90 | 48.90 | 75.67 | 80.91 |
| | 140° C. | 7.89 | 50.1 | 97.12 | 96.75 | 97.88 | 99.22 |

TABLE 4-continued

|  |  |  |  |  |  |  |  |
|---|---|---|---|---|---|---|---|
|  | Cylinder-Dried | 11.1 | 37.8 | 80.91 | 94.32 | 93.67 | 97.12 |
|  |  | 13.44 | 42.2 | 70.99 | 85.67 | 92.34 | 94.54 |
|  |  | 14.32 | 31.2 | 39.12 | 60.12 | 76.09 | 81.26 |
| Comp. Ex. 2 | After spinning | 4.32 | 87.6 | 97.65 | 99.12 | 99.98 | 100.00 |
|  | 145° C. air-through dried | — | — | — | — | — | — |
|  | 140° C. Cylinder-Dried | — | — | — | — | — | — |

As is clear from Tables 2 and 3, in Examples 1 to 4, which employed the ultrafine composite fibers of Production Examples 1 to 4 containing an island component or core component having a volume specific resistance of $10^{15}\,\Omega\cdot cm$ or less and a sea component or sheath component having a volume specific resistance exceeding $10^{15}\,\Omega\cdot cm$, the air-through dried non-woven fabrics and the cylinder-dried non-woven fabrics, regardless of the thickness and mass per unit area, exhibited higher levels of tensile strength and puncture strength than the spun non-woven fabrics that were not heat-treated. It can be seen, in particular, the non-woven fabrics of Examples 1 and 2 having a mass per unit area of 9 g/m² or more, which employed the sea-island structure ultrafine composite fibers of Production Examples 1 and 2 containing EVOH as the island component, exhibited a tensile strength three times or more higher than the spun non-woven fabrics that were not heat-treated. It also can be seen from Tables 2 and 3, regardless of the thickness and mass per unit area, the non-woven fabrics of Examples 1 to 3, which employed the ultrafine composite fibers of Production Examples 1 to 3 containing EVOH as the island component or core component, were superior in terms of puncture strength to the non-woven fabrics of Example 4, which employed the ultrafine composite fiber of Production Example 4 containing PET as the island component.

As can be seen from Tables 2 and 3, in Examples 1 to 3, the air-through dried non-woven fabrics and the cylinder-dried non-woven fabrics, regardless of their thickness and mass per unit area, had a smaller average pore size and maximum pore size than the spun non-woven fabrics that were not heat-treated, which means that the density was improved. In Example 4 as well, the air-through dried non-woven fabrics and the cylinder-dried non-woven fabrics of any thickness and mass per unit area except for the cylinder-dried non-woven fabric having a mass per unit area of 20 g/m² had a smaller average pore size and maximum pore size than the spun non-woven fabrics that were not heat-treated, which means that the density was improved. It can be seen, in particular, regardless of the thickness and mass per unit area, the non-woven fabrics of Examples 1 to 3, which employed the ultrafine composite fibers of Production Examples 1 to 3 containing EVOH as the island component or core component, had a smaller average pore size and maximum pore size than the average pore size and the maximum pore size of the non-woven fabrics of Example 4, which employed the ultrafine composite fiber of Production Example 4 containing PET as the island component, which means the non-woven fabrics of Examples 1 to 3 are superior in terms of density.

On the other hand, as is clear from Table 4, in Comparative Example 1, which employed the ultrafine composite fiber of Production Example 5 containing a sea component having a volume specific resistance of $10^{15}\,\Omega\cdot cm$ or less, the air-through dried non-woven fabrics and the cylinder-dried non-woven fabrics exhibited a slightly higher tensile strength and puncture strength than the spun non-woven fabrics that were not heat-treated, but when the mass per unit area was 12 g/m² or more, there was little change. Also, in Comparative Example 1, the air-through dried non-woven fabrics and the cylinder-dried non-woven fabrics, regardless of the thickness and mass per unit area, exhibited little change in average pore size and maximum pore size, as compared to the spun non-woven fabrics that were not heat-treated. In Comparative Example 2, which employed the ultrafine fiber of Production Example 8 produced using a liquid source resin by a solution electrospinning method, both the air-through dried non-woven fabric and the cylinder-dried non-woven fabric formed a film.

The measurement methods used in the following examples and comparative examples will be described below.

Method for Measuring Fiber Diameter

A fiber side face was inspected visually using a scanning electron microscope (SEM, S-3500N (trade name) manufactured by Hitachi, Ltd., magnification: 1500 times), and an average value was determined from the measurement results of randomly selected 30 monofilaments.

Mass Per Unit Area

Mass per unit area was measured according to JIS L 1906 5.2 (2006). The measurement was performed using only the fiber assembly obtained by peeling it from the electro conductive substrate of the composite.

Thickness

Thickness was measured according to JIS B 7502. The measurement was performed using only the fiber assembly obtained by peeling it from the electro conductive substrate of the composite.

Thermal Shrinkage

In accordance with JIS L 1906 5.9.1, the temperature within the apparatus was set to a measurement temperature such as 100° C., 125° C. or 140° C., a fiber assembly test piece having a width of 100 mm and a length of 100 mm was placed in the apparatus for one minute and thereafter removed from the apparatus, and thermal shrinkage in the lengthwise direction of the composite fiber was determined. The measurement was performed using only the fiber assembly obtained by peeling it from the electro conductive substrate of the composite.

Tensile Strength

Tensile strength in the lengthwise direction of the composite fiber was measured using a fiber assembly test piece having a width of 25 mm and a length of 100 mm in accordance with JIS L 1096 8.12.1 (strip method) (2006). The measurement was performed using only the fiber assembly obtained by peeling it from the electro conductive substrate of the composite.

Peel Strength

A test piece having a width of 25 mm and a length of 100 mm was cut out of the composite, the fiber assembly was peeled 75 mm from one end of the electro conductive substrate in the lengthwise direction, and thereafter the test piece was set in a tensile tester, with one clamp holding the fiber assembly over a width of 25 mm. The test piece was pulled at a pulling speed of 30 cm/min from a clamp interval of 100 mm to 130 mm, and thereby a stress-strain curve was obtained. Next, in the obtained stress-strain curve, the three highest and three lowest tensile strengths were selected, and the six tensile strengths were averaged and defined as the peel strength.

Puncture Strength

A fiber assembly was set in a fixed frame having a diameter of 25 mm, and then penetrated with a puncture needle having a tip radius of 1 mm at a speed of 100 mm/min. A load 40 at which defects such as holes were formed in the fiber assembly was determined and defined as the puncture strength. The measurement was performed using only the fiber assembly obtained by peeling it from the electro conductive substrate of the composite. Note that 1 gf equals to $9.8 \times 10^{-3}$ N.

Average Pore Size and Maximum Pore Size

Average pore size and maximum pore size were measured by a bubble point method according to ASTM F 316 86. The measurement was performed using only the fiber assembly obtained by peeling it from the electro conductive substrate of the composite.

Air Permeability

Air permeability was measured according to XS P 8117. B type Gurley densometer (manufactured by Toyo Seiki Seisaku-sho, Ltd.) was used as the measuring apparatus. A fiber assembly test piece was securely attached over a circular hole having a diameter of 28.6 mm and an area of 645 mm². The air in the cylinder was forced out of the cylinder through the test circular hole portion using an inner cylinder weight of 567 g. The time required for 100 cc of air to pass through the test piece was measured and defined as the air permeability (Gurley value). This measurement was performed using only the fiber assembly obtained by peeling it from the electro conductive substrate of the composite.

Source Resin

The following materials were used.

(1) Ethylene-vinyl alcohol copolymer (EVOH): K3835BN manufactured by Nippon Synthetic Chemical. Industry Co., Ltd., melting point: 171° C., melt flow rate measured according to JIS-K-7210 (MFR, measurement temperature: 230° C., load: 21.18 N (2.16 kgf): 35 g/10 min (2) Ethylene-propylene copolymer (EP): WXK1183 manufactured by Japan Polypropylene Corporation, melting point: 128° C., melt flow rate measured according to JIS-K-7210 (MFR, measurement temperature: 230° C., load: 21.18 N (2.16 kgf)): 25 g/10 min (3) Polyvinyl alcohol (PVA): an aqueous solution containing 10 mass % of JP-18S manufactured by Japan VAM & POVAL Co., Ltd.

Production of Composite Resin Formed Product

As for the composite resin formed product, melt-spinning was performed according to a conventional method to obtain an undrawn yarn, and the yarn was used as the source material composite resin formed product (source composite fiber).

Production Example 9

Electrospinning Method

The apparatus shown in FIG. 2 was used as an electrospinning apparatus under the following conditions.

Voltage between electrodes: 32.5 kV
Distance between electrodes: 10 cm
Spinning speed: 30 mm/min
Ambient temperature: 23° C.
Laser apparatus: PLN-30R manufactured by Onizuka Glass Co., Ltd. (rated output: 30 W, wavelength: 10.6 μm, beam diameter: 6 min)
Distance between supply-side electrode and laser irradiation section: 4 mm
Supply-side electrode: UN series 20G×15, as a single unit, manufactured by Unicontrols Co., Ltd., laser intensity: 20 mA
Electro conductive substrate: a lithium battery positive electrode made up of a 25 μm thick aluminum plate layer and active material layers, each having a thickness of 90 μm, provided on both surfaces of the aluminum plate layer (the positive electrode having a total thickness of 205 μm, a square having a length of 105 mm per side) was used.

Table 5 below shows the island component or core component (first component) and the sea component or sheath component (second component) of the source composite fiber used to produce an ultrafine composite fiber of Production Example 9, the proportion of the first component to the second component, the cross-sectional structure, the fiber diameter of a single monofilament, the total number of fibers, and the spinning flow rate. An ultrafine composite fiber of Production Example 9 was obtained using the source composite fiber shown in Table 5 by disposing an electro conductive substrate on the collection-side electrode, under the electrospinning conditions described above. Note that the ultra-fine composite fiber of Production Example 9 had a cross section similar to the fiber cross section of the source composite fiber.

Production Example 10

Electrospinning Method

An ultrafine composite fiber was produced using an aqueous solution containing 10 mass % of PVA by a conventional solution electrospinning method at a spinning flow rate of 0.0051 g/min under the following conditions: voltage between electrodes: 25 kV, distance between the electrodes: 8 cm, and ambient temperature: 23° C.

The fiber diameter of the ultrafine composite fibers of Production Examples 9 and 10 after spinning also is shown in Table 5.

TABLE 5

| | Source composite fiber (or source resin) | | | | | | | Size of monofilament after spinning (μm) |
|---|---|---|---|---|---|---|---|---|
| Production Example | Island (core) component | Sea (sheath) component | Cross-sectional structure | Proportion (mass %) | Spinning flow rate (g/min) | Size of monofilament (μm) | Number of fibers (fibers) | |
| 9 | EVOH | EP | Sea-island, 37 island fibers | 50/50 | 0.0067 | 22 | 181 | 0.89 |
| 10 | PVA | 10% aqueous PVA solution was used | | — | 0.0051 | — | — | 0.24 |

As is clear from Table 5, in Production Example 9, good spinning properties and an ultrafine composite fiber were obtained because in the source composite fiber that is the composite resin formed product, EVOH was used as the first component and ethylene-propylene copolymer (EP) was used as the second component. In Production Example 10, which employed a liquid source resin, an ultrafine fiber was obtained by the solution electrospinning method.

A scanning electron micrograph (SEM, magnified 2000 times) of the cross section of the source composite fiber used in Production Example 9 before spinning is shown in FIG. 8.

Example 5

First, the ultrafine composite fiber of Production Example 9 was accumulated on the surface of an electro conductive substrate to attain a specific mass per unit area, and thereby a composite of the electro conductive substrate and the fiber assembly (hereinafter referred to as a "composite immediately after spinning") was obtained. Next, the composite was heat-treated by a heating/pressurization method (linear pressure: 300 kg/cm, processing speed: 10 m/min) using a heated roll at 100° C., 125° C. and 140° C. so as to produce composites of the electro conductive substrate and the fiber assembly (hereinafter referred to as a "composite after 100° C. heat treatment", a "composite after 125° C. heat treatment", and a "composite after 140° C. heat treatment"). In each composite of Example 5, the fiber assembly had a mass per unit area of 10.2 g/m².

Scanning electron micrographs (SEM, magnified 1500 times) of the surface of the fiber assemblies of the composite immediately after spinning, the composite after 100° C. heat treatment, the composite after 125° C. heat treatment and the composite after 140° C. heat treatment of Example 5 are shown in FIGS. 12, 14, 16 and 18, respectively. Also, scanning electron micrographs (SEM, magnified 300 times) of the cross section of the composite immediately after spinning, the composite after 100° C. heat treatment, the composite after 125° C. heat treatment and the composite after 140° C. heat treatment of Example 5 are shown in FIGS. 13, 15, 17 and 19, respectively. In FIGS. 13, 15, 17 and 19, reference numeral 51 indicates the fiber assembly layer, 52 indicates the active material layer, and 53 indicates the aluminum plate layer.

It can be seen from FIGS. 12, 14, 16 and 18 that, with the heat treatments at 100° C., 125° C. and 140° C., the ethylene-propylene copolymer (EP) as the second component of the ultrafine composite fiber melted, but EVOH as the first component maintained the fibrous form, and thus the fiber assembly containing the ultrafine composite fiber did not form a film, and the composite maintained the sheet form. It also can be seen that the heat treatment at 100° C. is more preferable.

Example 6

A composite of Example 6 was obtained in the same manner as in Example 5, except that the mass per unit area of the fiber assembly of the composite was changed to 22.1 g/m².

Comparative Example 3

A composite of Comparative Example 3 was obtained in the same manner as in Example 5, using the ultrafine composite fiber of Production Example 10.

The composites of Examples 5 and 6 and Comparative Example 3 were subjected to measurements described above for the fiber assembly's material characteristics such as mass per unit area, thickness, thermal shrinkage, tensile strength, peel strength, puncture strength, air permeability average pore size and maximum pore size, and the measurement results are shown in Table 6 below

TABLE 6

| | Composite | Mass per unit area (g/m²) | Thickness (μm) | Thermal shrinkage (%) | Tensile strength (N/25 cm) | Peel strength (gf) | Puncture strength (gf) | Air permeability (s/100 cc) | Average pore size (μm) | Maximum pore size (μm) |
|---|---|---|---|---|---|---|---|---|---|---|
| Ex. 5 | After spinning | 10.2 | 65 | — | 3.217 | 0.2032 | 135 | 0.6 | 2.12 | 11.34 |
| | After heat treatment at 100° C. | 10.2 | 30 | 0.1 | 5.246 | 0.2752 | 156 | 1.1 | 1.34 | 5.67 |
| | After heat treatment at 125° C. | 10.2 | 28 | 0.3 | 6.543 | 0.3145 | 223 | 6.2 | 0.78 | 3.56 |
| | After heat treatment at 140° C. | 10.2 | 25 | 0.9 | 6.765 | 0.3286 | 245 | 9.2 | 0.67 | 2.34 |
| Ex. 6 | After spinning | 22.1 | 105 | — | 4.897 | 0.1215 | 345 | 3.2 | 1.45 | 6.76 |
| | After heat treatment at 100° C. | 22.1 | 62 | 0.1 | 8.951 | 0.1897 | 453 | 4.7 | 1.11 | 3.21 |
| | After heat treatment at 125° C. | 22.1 | 46 | 0.3 | 10.697 | 0.2321 | 498 | 7.8 | 0.55 | 2.98 |
| | After heat treatment at 140° C. | 22.1 | 42 | 1.5 | 10.987 | 0.3155 | 478 | 10.1 | 0.54 | 2.87 |
| Comp. Ex. 3 | After spinning | 16.5 | 29 | — | Not measurable | 0.1219 | 32 | 5.8 | 0.54 | 0.98 |
| | After heat treatment at 100° C. | 16.5 | 24 | 4.3 | Not measurable | Not measurable | 38 | 4.7 | 0.91 | 7.89 |
| | After heat treatment at 125° C. | 16.5 | 20 | Not measurable | Not measurable | Not measurable | Not measurable | — | — | — |

TABLE 6-continued

| Composite | Mass per unit area (g/m²) | Thickness (μm) | Thermal shrinkage (%) | Tensile strength (N/25 cm) | Peel strength (gf) | Puncture strength (gf) | Air permeability (s/100 cc) | Average pore size (μm) | Maximum pore size (μm) |
|---|---|---|---|---|---|---|---|---|---|
| After heat treatment at 140° C. | 16.5 | 20 | Not measurable | Not measurable | Not measurable | Not measurable | — | — | — |

As is clear from Table 6, the composites of an electrode and a fiber assembly of Examples 5 and 6 in which the electrode had been covered and integrated with the fiber assembly obtained by collecting the ultrafine composite fiber produced using EVOH as the first component and EP as the second component exhibited good material characteristics, including mass per unit area, thickness, thermal shrinkage, tensile strength, peel strength, puncture strength, air permeability, average pore size and maximum pore size, which are essential properties required in battery separators. In particular, the composite heat-treated at 100° C. exhibited excellent material characteristics. Furthermore, in Examples 5 and 6, the fiber assembly does not contain any solvent or water, and thus does not raise, when used as a battery separator, the possibility of electrolyte contamination caused by intrusion of extraneous matter into the electrolyte due to seepage of a solvent remaining within the fiber or on the fiber surface or seepage of a component resulting from the solvent.

In contrast, in Comparative Example 3, which employed the ultrafine fiber of Production Example 10 produced by a solution electrospinning method using an aqueous source resin solution obtained by liquefying the source resin with a solvent, the fiber assembly of the composite immediately after spinning had a low tensile strength and peel strength. Also, a significant thermal shrinkage occurred during heat treatment at 100° C., and measurement was not possible. The pore size was deteriorated, due to the heat treatment, and thus the sheet form was not maintained.

The following describes experiments in which a fiber assembly obtained by electrospinning according to an embodiment of the present invention was used as a battery separator.

Positive Electrode Material

A positive electrode material was prepared by applying a positive electrode active material containing manganese (Mn) and a ternary alloy (nickel+cobalt+manganese) at a ratio of 6:4 to a 20 μm thick aluminum foil with an application amount of 256 g/m² (proportion of active material: 89%).

Negative Electrode Material

A negative electrode material was prepared by applying a negative electrode active material containing natural graphite (OMAP) and polyvinylidene fluoride (PVDF) to a 14 μm thick copper foil with an application amount of 118 g/m² (proportion of active material: 90%).

Electrolyte

An electrolyte was prepared containing 4 mass % of vinylene carbonate as a durability improving material, 1 mass % of Phoslite as a flame retardant and 1 mass % of calcium stearate as a surfactant per 100 parts by mass of a mixture of ethylene carbonate (EC), dimethyl carbonate (DC) and ethyl methyl carbonate (EMC) at a ratio of 3/3/4.

Example 7

First, the ultrafine composite fiber of Production Example 9 was accumulated on both surfaces of the positive electrode material to attain a mass per unit area of 10 g/m², and thereby a composite of the positive electrode material and the fiber assembly was obtained. Next, the composite was heat-treated by a heating/pressurization method (linear pressure: 300 kg/cm, processing speed: 10 m/min) using a heated roll at 100° C., and thereby a heat-treated composite was produced. In the composite of Example 7, each fiber assembly had a thickness of 30 μm.

Next, 47 sheets of each of the heat-treated composite and the negative electrode material were prepared, and the heat-treated composite sheets and the negative electrode material sheets were alternately laminated, and a battery was produced using the electrolyte prepared above.

Comparative Example 4

A separator material was obtained by laminating a 25 μm thick microporous membrane made of 100% of a high density polyethylene (Hipore manufactured by Asahi Kasei Corporation) on the surface of a 30 μm thick wet laid non-woven fabric having a mass per unit area of 9.0 g/m² and made of 100% of a core-sheath structure composite fiber (NBF (H) manufactured by Daiwabo Polytec Co., Ltd.) containing polypropylene as the core component and a high density polyethylene as the sheath component and having a fiber length of 5 mm and a fineness of 0.8 dtex.

Next, 52 sheets of each of the positive electrode material, and the negative electrode material were prepared, and the positive electrode material sheets and the negative electrode material sheets were alternately laminated with the separator material interposed therebetween, and a battery was produced using the electrolyte prepared above.

Battery characteristics were measured according to the following tests.

Capacity Retention Rate

After initial activation, each battery was charged to 4.15 V at 1 C (energizing current: 30 A), 2 C (energizing current: 60 A) or 4 C (energizing current: 120 A), allowed to stand for 0.5 hours, and thereafter discharged to an end voltage of 2.9 V. After this cycle was repeated 5 times, the discharge capacity was measured, then, the battery was charged under the same conditions and allowed, to stand at 45° C. for 14 days, and the remaining capacity (end voltage: 2.9 V) was measured. The ratio of the remaining capacity to the discharge capacity obtained after repeating the cycle 5 times was defined as the capacity retention rate after self-discharge.

Discharge Capacity

After initial activation, each battery was charged to 4.15 V at 0.5 C (energizing current: 15 A), 1 C (energizing current: 30 A), 2 C (energizing current: 60 A) or 4 C (energizing current: 120 A), allowed to stand for 0.5 hours, and thereafter discharged to an end voltage of 2.9 V This cycle was repeated 5 times, and the discharge capacity at the 5th cycle was measured and defined as the discharge capacity Overcharge Test The overcharge test was performed by charging each battery charged to 4.15 V in advance to 10 V at 0.5 C (energizing current: 15 A). The battery was inspected visually during and after overcharging for the occurrence of exothermic thermal runaway and ignition. The highest voltage during overcharge test, the voltage during stoppage of overcharging, the overcharge rate, and the temperature when overcharging was stopped were measured. This test was carried out at 25° C.

Table 7 shows the results regarding capacity retention rate and discharge capacity performed in Example 7 and Comparative Example 4.

TABLE 7

|  | Capacity retention rate (%) | | | Discharge capacity (Ah) | | | |
| --- | --- | --- | --- | --- | --- | --- | --- |
|  | 1 C | 2 C | 4 C | 0.5 C | 1 C | 2 C | 4 C |
| Ex. 7 | 100 | 92.4 | 43.1 | 24.93 | 24.27 | 22.43 | 10.47 |
| Comp. Ex. 4 | 100 | 74.4 | 11.9 | 28.13 | 27.52 | 20.47 | 3.27 |

As is clear from Table 7, the battery of Example 7 exhibited superior capacity retention rates to the battery of Comparative Example 4. Also, the battery of Example 7 exhibited a higher capacity retention rate and discharge capacity at 4 C, which is a high output condition, than the battery of Comparative Example 4, which means that the battery of Example 7 is superior in terms of high output characteristics.

Table 8 shows the results from the overcharge test performed in Examples 7 and Comparative Example 4.

TABLE 8

|  | Highest voltage (V) | Voltage before overcharging was stopped (V) | Overcharge rate (%) | Temperature when overcharging was stopped (° C.) | Occurrence of exothermic thermal runaway |
| --- | --- | --- | --- | --- | --- |
| Ex. 7 | 4.87 | 5.4 | 171 | 85 | No exothermic thermal runaway |
| Comp. Ex. 4 | 5.25 | 5.3 | 165 | 65 | No exothermic thermal runaway |

As is clear from Table 8, the battery of Example 7 reached the highest voltage 40 minutes after start of the overcharge test. Then, 60 minutes after start of the overcharge test, a gas began to flow out, the voltage increased rapidly, reaching 10 V and the overcharge ended. After the overcharge, the surface temperature decreased without the battery going into an exothermic thermal runaway condition, and the voltage decreased to 4.36 V and remained stable.

As for the battery of Comparative Example 4, an outflow of gas was observed 43 minutes after start of the overcharge test. Then, 65 minutes after start of the overcharge test, the battery reached the highest voltage. Thereafter, the voltage increased rapidly reaching 10 V, and the overcharge ended. After the overcharge, the surface temperature decreased without the battery going into an exothermic thermal runaway condition, and the voltage decreased to 4.20 V and remained stable.

The battery of Example 7 was charged in a stable manner without ejection of a gas until it reached the highest voltage. The batteries of Example 7 and Comparative Example 4 exhibited an excellent level of safety during overcharge. Generally, batteries using a microporous membrane as a separator material as in Comparative Example 4 are regarded as having an excellent level of safety during overcharge. The battery of Example 7 was found to have the same level of Safety as the battery of Comparative Example 4, and therefore it can be said that the battery of Example 7 has an excellent level of safety during overcharge. This is presumably because the ultrafine composite fiber constituting the composite included in the battery of Example 7 melted upon exposure to a high temperature, forming a membrane-like structure, and completely preventing contact between the positive electrode material and the negative electrode material.

Comparative Example 5

A separator material was obtained by accumulating the ultrafine fiber of Production Example 10 to attain a mass per unit area of 10 g/m$^2$ on the surface of a 26 μm thick wet laid non-woven fabric having a mass per unit area of 8.3 g/m$^2$ and made of 100% of a core-sheath structure composite fiber (NBF (H) manufactured by Daiwabo Polytec Co., Ltd.) containing polypropylene as the core component and a high density polyethylene as the sheath component and having a fiber length of 5 mm and a fineness of 0.8 dtex.

Next, 51 sheets of each of the positive electrode material and the negative electrode material were prepared, and the positive electrode material sheets and the negative electrode material sheets were alternately laminated with the separator material interposed therebetween, and a battery was produced using the electrolyte prepared above.

The battery of Comparative Example 5 exhibited the same levels of capacity retention rate and discharge capacity as the battery of Example 7. However, in the overcharge test, the battery of Comparative Example 5 went into an exothermic thermal runaway immediately after an end voltage of 10 V was reached and overcharging was stopped, and at the same time a large amount of white smoke was generated, the released gas was ignited, and the entire battery caught on fire.

The battery of Example 7 exhibited a superior level of safety during overcharge to the battery of Comparative Example 5. This is presumably because the fiber assembly constituting the composite used in the battery of Example 7 is constituted by a composite fiber, and therefore even when one component is melted, the other component maintains the fibrous form, as a result of which the fiber assembly is unlikely to shrink. In contrast, the fiber assembly of Comparative Example 5 is constituted by a fiber composed of only one component, and therefore when the single component is dissolved, the fiber network collapses and shrinkage can easily occur, resulting in a poor level of safety.

Furthermore, the ultrafine composite fiber constituting the composite used in the battery of Example 7 does not contain any solvent or water, and thus does not have, when it is used as a battery separator, the possibility of electrolyte contamination caused by intrusion of extraneous matter into the electrolyte due to seepage of a solvent remaining within the fiber or on the fiber surface or seepage of a component resulting from the solvent.

The battery of Example 7 also was superior to the batteries of Comparative Examples 4 and 5 in terms of workability during the process of laminating the positive electrode material and the negative electrode material. The battery of Example 7 had a configuration in which the positive electrode material and the fiber assembly were integrated, and the heat treatment made it difficult to detach the fiber assembly; as a result of which no wrinkling or damage occurred in the fiber assembly during the process of laminating the positive electrode material and the negative electrode material. In contrast, in the batteries of Comparative Examples 4 and 5, the positive electrode material, the negative electrode material and the separator material were independent of each other, and thus wrinkling and damage occurred in the separator material during the process of laminating the positive electrode material and the negative electrode material.

Industrial Applicability

The fiber assembly of the present invention is useful as a filter, a battery separator (lithium ion battery separator in particular), paper, a non-woven fabric or the like. The composite of the present invention is useful as a battery separator (lithium ion battery separator in particular), a filter, a sound absorbing material, a covering material or the like.

DESCRIPTION OF REFERENCE NUMERALS 1, 21 Supply-Side Electrode
2, 24 Collection-Side Electrode
3 Voltage Generator
4, 25 Laser Irradiation Device
5 Container
6 Fiber Deposit
7 Source Composite Fiber
8, 9 Guide
10 Feed Roller
11, 20 Electrospinning Apparatus
12, 29 Fiber Assembly of Ultrafine Composite Fiber
13, 26 Electro Conductive Substrate
22 High Voltage Terminal
23 Polyimide Resin Plate
30, 40 Ultrafine Composite Fiber
31 Island Component
32 Sea Component
41 Core Component
42 Sheath Component
51 Fiber Assembly Layer
52 Active Material Layer
53 Aluminum Plate Layer
60 Melt-Spinning Apparatus
61a, 61b Extruder
62a, 62b Melted-Polymer Feed Line
63 Composite Spinning Machine
64 Heating or Temperature Retaining Region
65 Composite Fiber in Melted State

The invention claimed is:

1. A fiber assembly comprising an ultrafine composite fiber,
wherein the fiber assembly is obtained by electrifying a resin in a melted state by application of voltage between a supply-side electrode and a collection-side electrode so as to extend the resin into the ultrafine composite fiber by electrospinning, and accumulating the ultrafine composite fiber,
the ultrafine composite fiber comprises at least two polymeric components,
the ultrafine composite fiber comprises at least one type of a composite fiber selected from the group consisting of a sea-island structure composite fiber and a core-sheath structure composite fiber, as viewed in fiber cross section,
at least one component selected from an island component in the sea-island structure composite fiber and a core component in the core-sheath structure composite fiber has a volume specific resistance of $10^{15}\Omega\cdot cm$ or less,
at least one component selected from a sea component in the sea-island structure composite fiber and a sheath component in the core-sheath structure composite fiber has a volume specific resistance exceeding $10^{15}\Omega\cdot cm$,
the at least one component selected from the core component and the island component is an ethylene-vinyl alcohol copolymer,
the at least one component selected from the sheath component and the sea component is a polyolefin,
the ultrafine composite fiber has a fiber diameter of 5 μm or less, and
the fiber assembly is formed in a sheet form in which portions of the ultrafine composite fibers are thermally bonded to each other by thermal adhesion of the at least one component selected from the sea component and the sheath component.

2. The fiber assembly according to claim 1,
wherein a polymer of the at least one component selected from the sea component and the sheath component has a melting point lower than a melting point of a polymer of the at least one component selected from the island component and the core component, by at least 10° C.

3. The fiber assembly according to claim 1,
wherein the polymer of the at least one component selected from the island component and the core component has a melting point ranging from 100 to 300° C., and
the polymer of the at least one component selected from the sea component and the sheath component has a melting point ranging from 70 to 180° C.

4. The fiber assembly according to claim 1,
wherein the fiber assembly contains neither a solvent nor water except in an unavoidable amount.

5. A composite of an electro conductive substrate and a fiber assembly comprising: an electro conductive substrate; and a fiber assembly,
wherein the fiber assembly is obtained by electrifying a resin in a melted state by application of voltage between a supply-side electrode and a collection-side electrode so as to extend the resin into an ultrafine composite fiber by electrospinning, and accumulating the ultrafine composite fiber,
the ultrafine composite fiber comprises at least two polymeric components,
the ultrafine composite fiber comprises at least one type of composite fiber selected from the group consisting of a sea-island structure composite fiber and a core-sheath structure composite fiber, as viewed in fiber cross section,
at least one component selected from an island component in the sea-island structure composite fiber and a core component in the core-sheath structure composite fiber has volume specific resistance of $10^{15}\Omega\cdot cm$ or less,
at least one component selected from a sea component in the sea-island structure composite fiber and a sheath component in the core-sheath structure composite fiber has volume specific resistance exceeding $10^{15}\Omega\cdot cm$,
the at least one component selected from the core component and the island component is an ethylene-vinyl alcohol copolymer, and
the at least one component selected from the sheath component and the sea component is a polyolefin
the ultrafine composite fiber has a fiber diameter of 5 μm or less,
the fiber assembly is formed in a sheet form in which portions of the ultrafine composite fibers are thermally bonded to each other by thermal adhesion of the at least one component selected from the sea component and the sheath component, and at least a part or all of a surface of the electro conductive substrate is covered and integrated with the fiber assembly.

6. The composite of the electro conductive substrate and the fiber assembly according to claim 5, wherein the ultrafine composite fiber is partially embedded in the surface of the electro conductive substrate.

7. The composite of the electro conductive substrate and the fiber assembly according to claim 5, wherein the electro conductive substrate is a battery electrode, and the fiber assembly is a battery separator.

8. A method for producing a fiber assembly comprising steps of:

heating and melting a composite-resin-formed product in a solid state or a melted state in at least one region selected from the group consisting of a region in advance of a supply-side electrode and a region between the supply-side electrode and a collection-side electrode;

extending the composite-resin-formed product into an ultrafine composite fiber by electrospinning; and accumulating the ultrafine composite fiber, wherein the ultrafine composite fiber comprises at least two polymeric components, the ultrafine composite fiber comprises at least one type of a composite fiber selected from the group consisting of a sea-island structure composite fiber and a core-sheath structure composite fiber, as viewed in fiber cross section, at least one selected from an island component in the sea-island structure composite fiber and a core component in the core-sheath structure composite fiber has volume specific resistance of $10^{15}\Omega\cdot cm$ or less, at least one selected from a sea component in the sea-island structure composite fiber and a sheath component in the core-sheath structure composite fiber has volume specific resistance exceeding $10^{15}\Omega\cdot cm$, the at least one component selected from the core component and the island component is an ethylene-vinyl alcohol copolymer, the at least one component selected from the sheath component and the sea component is a polyolefin, the ultrafine composite fiber has a fiber diameter of 5 μm or less, and the fiber assembly is formed in a sheet form in which portions of the ultrafine composite fibers are thermally bonded to each other by thermal adhesion of the at least one component selected from the sea component and the sheath component.

9. The method for producing a fiber assembly according to claim 8, wherein the composite-resin-formed product in the solid state or the melted state comprises at least two polymeric components, the composite-resin-formed product in the solid or the melted state comprises at least one type of composite fiber selected from a sea-island structure composite fiber and a core-sheath structure composite fiber, as viewed in fiber cross section, at least one component selected from an island component in the sea-island structure composite fiber and a core component in the core-sheath structure composite fiber has volume specific resistance of $10^{15}\Omega\cdot cm$ or less, and at least one component selected from a sea component in the sea-island structure composite fiber and a sheath component in the core-sheath structure composite fiber has volume specific resistance exceeding $10^{15}\Omega\cdot cm$.

10. A method for producing a composite of an electro conductive substrate and a fiber assembly in which at least a part or all of a surface of the electro conductive substrate is covered and integrated with the fiber assembly, comprising:

depositing the electro conductive substrate on a collection-side electrode;

heating and melting a composite-resin-formed product in a solid state or a melted state in at least one region selected from the group consisting of a region in advance of a supply-side electrode and a region between the supply-side electrode and the collection-side electrode;

extending the composite-resin-formed product into an ultrafine composite fiber by electrospinning; and accumulating the ultrafine composite fiber on the surface of the electro conductive substrate so as to form a fiber assembly in which the electro conductive substrate is covered and integrated with the fiber assembly, wherein the ultrafine composite fiber comprises at least two polymeric components, the ultrafine composite fiber comprises at least one type of composite fiber selected from a sea-island structure composite fiber and a core-sheath structure composite fiber, as viewed in fiber cross section, at least one component selected from an island component in the sea-island structure composite fiber and a core component in the core-sheath structure composite fiber has volume specific resistance of $10^{15}\Omega\cdot cm$ or less, at least one component selected from a sea component in the sea-island structure composite fiber and a sheath component in the core-sheath structure composite fiber has volume specific resistance exceeding $10^{15}\Omega\cdot cm$, the at least one component selected from the core component and the island component is an ethylene-vinyl alcohol copolymer, the at least one component selected from the sheath component and the sea component is a polyolefin, the ultrafine composite fiber has a fiber diameter of 5 μm or less, and the fiber assembly is formed in a sheet form in which portions of the ultrafine composite fibers are thermally bonded to each other by thermal adhesion of the at least one component selected from the sea component and the sheath component.

11. The composite of an electro conductive substrate and a fiber assembly according to claim 5, wherein a polymer of the at least one component selected from the sea component and the sheath component has a melting point lower than a melting point of a polymer of the at least one component selected from the island component and the core component, by at least 10° C.

12. The composite of an electro conductive substrate and a fiber assembly according to claim 5, wherein a polymer of the at least one component selected from the island component and the core component has a melting point ranging from 100 to 300° C., and a polymer of the at least one selected from the sea component and the sheath component has a melting point ranging from 70 to 180° C.

13. The composite of an electro conductive substrate and a fiber assembly according to claim 5, wherein the fiber assembly contains neither a solvent nor water except in an unavoidable amount.

14. The fiber assembly according to claim 1, wherein the ultrafine composite fiber has a fiber diameter of 3 μm or less.

15. The composite of the electro conductive substrate and the fiber assembly according to claim 5,
   wherein the ultrafine composite fiber has a fiber diameter of 3 μm or less.

16. The method for producing the fiber assembly according to claim 8,
   wherein the ultrafine composite fiber has a fiber diameter of 3 μm or less.

17. The method for producing the composite of the electro conductive substrate and the fiber assembly according to claim 10,
   wherein the ultrafine composite fiber has a fiber diameter of 3 μm or less.

* * * * *